United States Patent
Takase et al.

(10) Patent No.: US 8,370,418 B2
(45) Date of Patent: Feb. 5, 2013

(54) RELAY APPARATUS AND METHOD FOR TRANSFERRING MESSAGE

(75) Inventors: Masaaki Takase, Kawasaki (JP); Hitoshi Ueno, Kawasaki (JP); Kenichi Abiru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 287 days.

(21) Appl. No.: 12/845,893

(22) Filed: Jul. 29, 2010

(65) Prior Publication Data

US 2011/0035436 A1 Feb. 10, 2011

(30) Foreign Application Priority Data

Aug. 7, 2009 (JP) .................................. 2009-184825

(51) Int. Cl.
*G06F 15/16* (2006.01)
(52) U.S. Cl. .................................................... 709/201
(58) Field of Classification Search .................. 709/201
See application file for complete search history.

(56) References Cited

U.S. PATENT DOCUMENTS

| | | | |
|---|---|---|---|
| 2003/0028668 A1* | 2/2003 | Garcia-Luna-Aceves et al. | 709/238 |
| 2007/0192492 A1 | 8/2007 | Okazaki | |

FOREIGN PATENT DOCUMENTS

| | | |
|---|---|---|
| JP | 2001-518663 A | 10/2001 |
| JP | 2007-219608 A | 8/2007 |
| WO | WO 99-17203 | 4/1999 |

* cited by examiner

*Primary Examiner* — Ryan Jakovac
(74) *Attorney, Agent, or Firm* — Fujitsu Patent Center

(57) ABSTRACT

A relay apparatus for transferring message data received from a client to one of a plurality of servers includes a status management data storage, a transfer rule handling section, and an acknowledgment transmitting section. The status management data storage holds data of an acknowledgment necessity table. The acknowledgment necessity table includes first identification information of a first apparatus to which the relay apparatus acknowledges when the relay apparatus has received first transfer rule notification data from the first apparatus. The transfer rule handling section determines whether the acknowledgment necessity table includes the first identification information identical to second identification information of a second apparatus upon receiving second transfer rule notification data from the second apparatus. The acknowledgment transmitting section transmits acknowledgment data to the second apparatus when the acknowledgment necessity table includes the first identification information identical to the second identification information.

7 Claims, 20 Drawing Sheets

| IDENTIFIER | TRANSFER DESTINATION ADDRESS |
|---|---|
| APL-a | a.b.c.d |
| APL-b | e.f.g.h |
| APL-c | i.j.k.l |

FIG. 7

| IDENTIFIER | SELF DETERMINATION FLAG | ACKNOWLEDGMENT EXPECTATION FLAG |
|---|---|---|
| APL-a | ON | ON |
| APL-b | ON | OFF |
| APL-c | OFF | OFF |

| APPARATUS No. | APPARATUS No. OF ACKNOWLEDGMENT DESTINATION | APPARATUS No. OF ACKNOWLEDGMENT SOURCE |
|---|---|---|
| 1 | 2 | 6 |

FIG. 9B

| APPARATUS No. | APPARATUS No. OF ACKNOWLEDGMENT DESTINATION | APPARATUS No. OF ACKNOWLEDGMENT SOURCE |
|---|---|---|
| 2 | 3 | 1 |

FIG. 9C

| APPARATUS No. | APPARATUS No. OF ACKNOWLEDGMENT DESTINATION | APPARATUS No. OF ACKNOWLEDGMENT SOURCE |
|---|---|---|
| 3 | 4 | 2 |

FIG. 9D

| APPARATUS No. | APPARATUS No. OF ACKNOWLEDGMENT DESTINATION | APPARATUS No. OF ACKNOWLEDGMENT SOURCE |
|---|---|---|
| 4 | 5 | 3 |

FIG. 9E

| APPARATUS No. | APPARATUS No. OF ACKNOWLEDGMENT DESTINATION | APPARATUS No. OF ACKNOWLEDGMENT SOURCE |
|---|---|---|
| 5 | 6 | 4 |

FIG. 9F

| APPARATUS No. | APPARATUS No. OF ACKNOWLEDGMENT DESTINATION | APPARATUS No. OF ACKNOWLEDGMENT SOURCE |
|---|---|---|
| 6 | 1 | 5 |

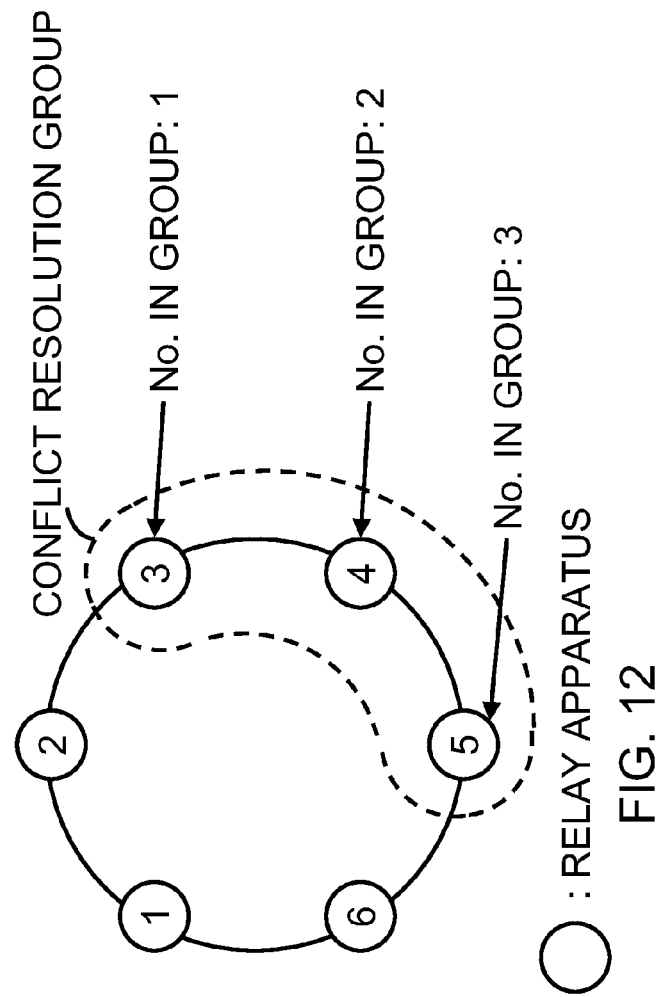
| APPARATUS No. | No. IN GROUP |
|---|---|
| 3 | 1 |
| 4 | 2 |
| 5 | 3 |
FIG. 11
FIG. 12
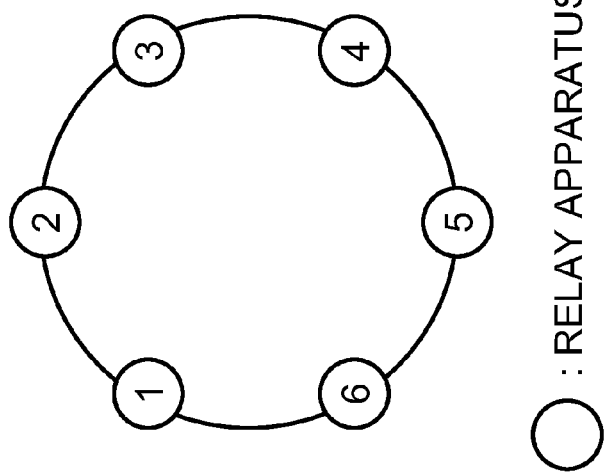
FIG. 10

| PROTOCOL TYPE | LOCATION OF IDENTIFIER |
|---|---|
| SOAP/http | Xpath=//service[id="srv-x"]/sid/text() |
| SIP | call-id: |

FIG. 15

```
<SOAP-header>
 ..
PROTOCOL: SOAP/HTTP
 ..
</SOAP-header>
<SOAP-body>
 ..
  <APL-ID>APL-a</APL-ID>
 ..
</SOAP-body>
```

FIG. 16

```
GET http://abc.com/ HTTP/1.1
HOST: abc.com
User-Agent: xyz
APL-ID: APL-a
  .....
(http-body)
  .....
```

FIG. 17

MESSAGE TYPE: TRANSFER RULE NOTIFICATION
IDENTIFIER: APL-a
TRANSFER DESTINATION ADDRESS: a.b.c.d
APPARATUS No.: 1
CONFLICT RESOLUTION FLAG: OFF

FIG. 19

MESSAGE TYPE: ACKNOWLEDGMENT
IDENTIFIER: APL-a
TRANSFER DESTINATION ADDRESS: a.b.c.d
APPARATUS No.: 1

FIG. 20

MESSAGE TYPE: TRANSFER RULE NOTIFICATION
IDENTIFIER: APL-a
TRANSFER DESTINATION ADDRESS: a.b.c.d
APPARATUS No.: 1
CONFLICT RESOLUTION FLAG: ON
AMOUNT OF APPARATUSES: n
No. IN GROUP: 1

FIG. 21

RELAY APPARATUS AND METHOD FOR TRANSFERRING MESSAGE

CROSS-REFERENCE TO RELATED APPLICATION

This application is based upon and claims the benefit of priority of the prior Japanese Patent Application No. 2009-184825, filed on Aug. 7, 2009, the entire contents of which are incorporated herein by reference.

FIELD

The embodiments discussed herein are related to a technology for transferring a message while ensuring the uniqueness of a transfer destination.

BACKGROUND

There has been technologies for constructing a system including a plurality of relay apparatuses to distribute processing load on a relay apparatus transferring data (referred to as message data) of a message exchanged between a client and an application (APL) server.

FIG. 27 illustrates an example of a system including a plurality of relay apparatuses. In FIG. 27, when a load balancer (LB) or the like receives message data from a client, the LB distributes the received message data to one of the relay apparatuses by using various types of load balancing algorithms. Upon receiving the message data received from the LB, the relay apparatus accesses an external device and acquires transfer rules to perform message transfer in accordance with the acquired transfer rules. In the system illustrated in FIG. 27, the external device performs centralized control of the transfer rules. Thus, the system may perform message transfer such that a series of message data including identical identifier (ID) data, for example, is transferred to the same APL server. In the present application, such message transfer is referred to as message transfer ensuring the uniqueness of a transfer destination.

Alternatively, each of the relay apparatuses included in the system may hold data of identical transfer rules to ensure the uniqueness of a transfer destination.

SUMMARY

According to an aspect of the present invention, provided is a relay apparatus for transferring message data received from a client to one of a plurality of servers. The relay apparatus includes a status management data storage, a transfer rule handling section, and an acknowledgment transmitting section.

The status management data storage holds data of an acknowledgment necessity table. The acknowledgment necessity table includes first identification information of a first apparatus to which the relay apparatus acknowledges when the relay apparatus has received first transfer rule notification data from the first apparatus. The first apparatus is one of a plurality of relay apparatuses each of which broadcasts transfer rule notification data.

The transfer rule handling section determines whether the acknowledgment necessity table includes the first identification information identical to second identification information of a second apparatus upon receiving second transfer rule notification data from the second apparatus. The second apparatus is one of the plurality of relay apparatuses.

The acknowledgment transmitting section transmits acknowledgment data to the second apparatus when the acknowledgment necessity table includes the first identification information identical to the second identification information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating exemplary data stored in a transfer rule storage according to an embodiment of the present invention;

FIG. 8 is a diagram illustrating exemplary data of a status management table stored in a status management data storage according to an embodiment of the present invention;

FIGS. 9A to 9F are diagrams illustrating exemplary data of an acknowledgment necessity table stored in a status management data storage according to an embodiment of the present invention;

FIG. 10 is a diagram illustrating an example of relay apparatuses associated with each other in accordance with acknowledgment necessity tables according to an embodiment of the present invention;

FIG. 11 is a diagram illustrating exemplary data of a conflict list stored in a status management data storage according to an embodiment of the present invention;

FIG. 12 is a diagram illustrating an example of relay apparatuses associated with each other in accordance with a conflict list according to an embodiment of the present invention;

FIG. 15 is a diagram illustrating exemplary data of identification rule according to an embodiment of the present invention;

FIG. 16 is a diagram illustrating an example of SOAP/HTTP message data;

FIG. 17 is a diagram illustrating an example of HTTP message data;

FIG. 19 is a diagram illustrating an example of transfer rule notification data according to an embodiment of the present invention;

FIG. 20 is a diagram illustrating an example of acknowledgment data for transfer rule notification data according to an embodiment of the present invention;

FIG. 21 is a diagram illustrating an example of transfer rule notification data according to an embodiment of the present invention;

DESCRIPTION OF EMBODIMENTS

The above-discussed method poses problems interfering with improvements in performance as discussed below. Firstly, the relay apparatus accesses the external device in each message transfer, which brings an increase in overhead. Secondly, since a plurality of relay apparatuses access the external device, exclusive control may be performed. Therefore, when one of the relay apparatuses accesses the external device, the other relay apparatuses have to wait during the access. The waiting time increases with an increase in the amount of the relay apparatuses so that an increase in overhead results. In the case where each of the relay apparatuses holds data of identical transfer rules, it may be difficult to eliminate overhead caused by exclusive control since each of the relay apparatuses may be locked at the time of updating information.

To share a transfer rule among the relay apparatuses without performing the centralized control or the exclusive control, for example, message data may be provided to notify other relay apparatuses of the transfer rule. However, it is not practical because a large amount of message data may be exchanged between the relay apparatuses as data (referred to as acknowledgment data) of acknowledgment (ACK) message for a message data (referred to as transfer rule notification data) provided to notify other relay apparatuses of a transfer rule.

It may be preferable to reduce the acknowledgment data for the transfer rule notification data.

Figure 1:
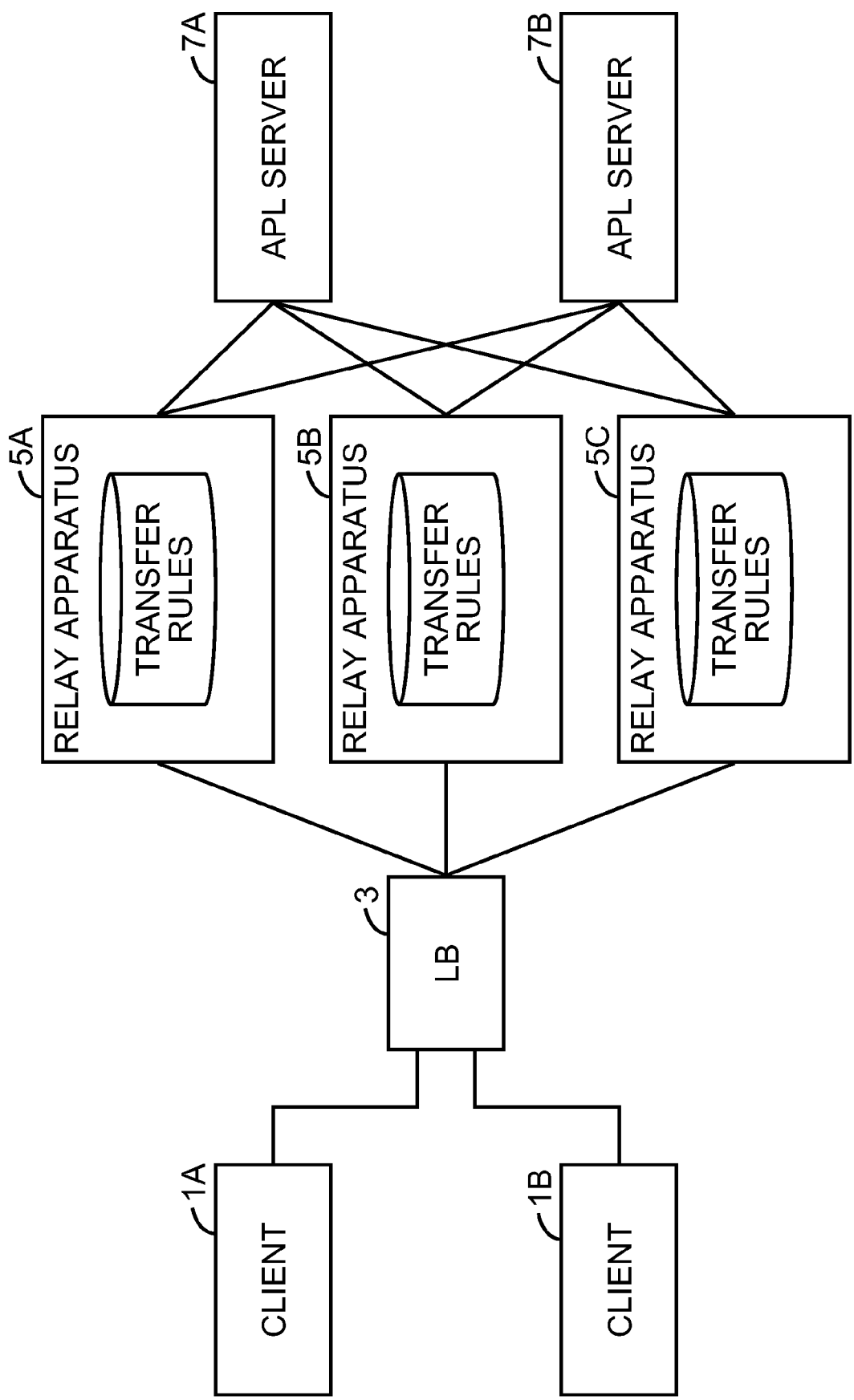
FIG. 1 is a diagram illustrating an example of a configuration of a system according to an embodiment of the present invention.

FIG. 1 illustrates an example of a configuration of a system according to the present embodiment. As illustrated in FIG. 1, each of relay apparatuses 5 (5A, 5B, and 5C in FIG. 1) is connected to an LB 3 and each of APL servers 7 (7A and 7B in FIG. 1). Each of clients 1 (1A and 1B in FIG. 1) is connected to the LB 3. The amounts of the clients 1, the relay apparatuses 5, and the APL servers 7 are not limited to that discussed in the example. In the present embodiment, each of the relay apparatuses 5 holds data of the transfer rules (referred to as transfer rule data). Functional configuration of the relay apparatuses 5 will be discussed in detail with reference to FIG. 6.

Figure 2:
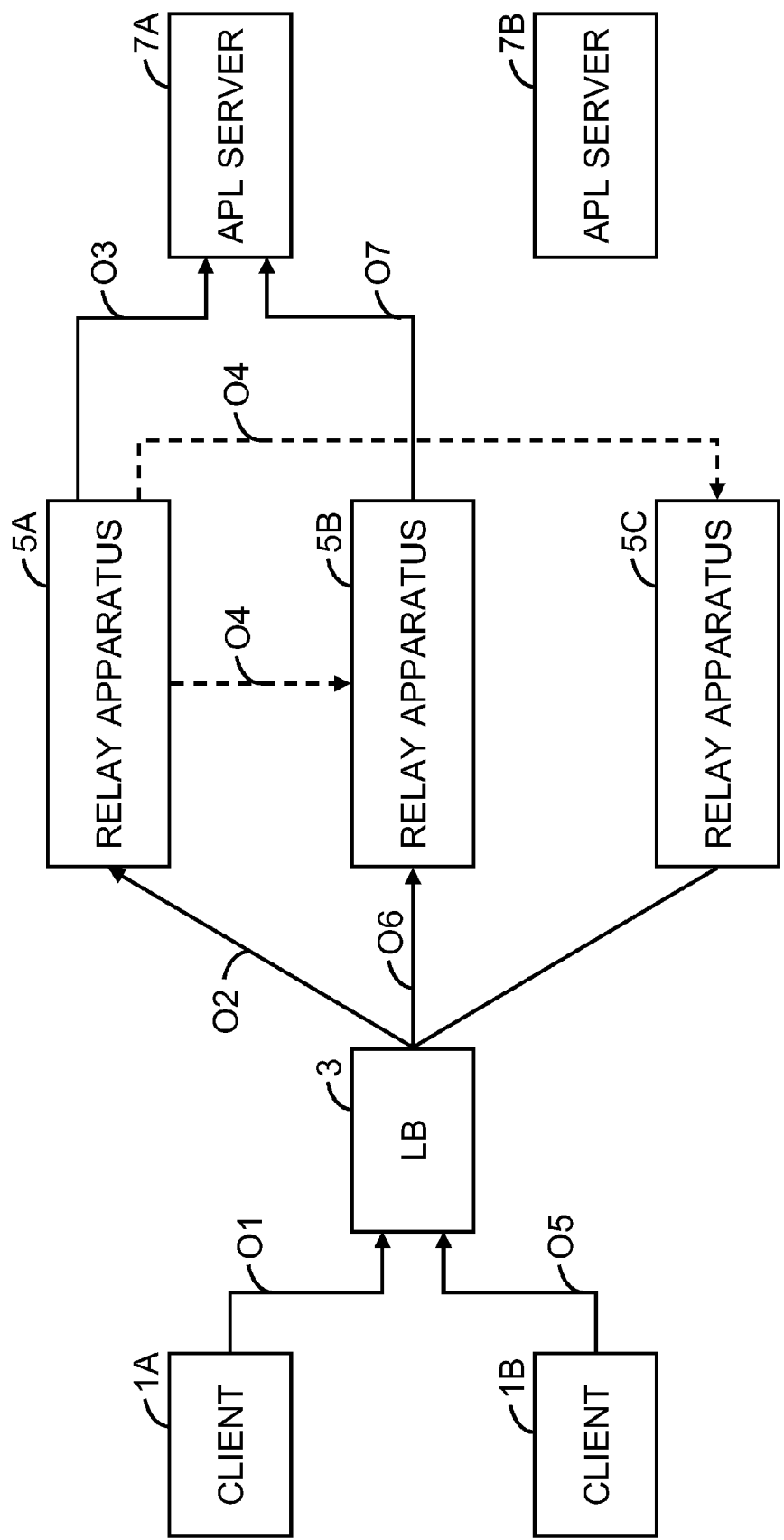
FIG. 2 is a diagram illustrating an example of operations of a system according to an embodiment of the present invention.

When one of the relay apparatuses 5 determines a new transfer destination in the system illustrated in FIG. 1, for example, the one of the relay apparatuses 5 notifies other relay apparatuses 5 of information about the new transfer destination to synchronize the transfer rules. FIG. 2 illustrates an example of basic operations of a system according to the embodiment. Operations of the system illustrated in FIG. 1 will be discussed with reference to FIG. 2. In FIG. 2, a solid arrow indicates message data (referred to as client message data) transmitted from the client 1 to the APL server 7, and a dashed arrow indicates message data (referred to as control message data) exchanged between the relay apparatuses 5, the same goes for subsequent drawings.

In operation O1, the client 1A transmits message data to the LB 3. The message data includes data of a new identifier. Upon receiving the message data from the client 1A, the LB 3 determines a distribution destination by using various types of load balancing algorithms. It is assumed, in the present embodiment, that the LB 3 has determined the relay apparatus 5A to be the distribution destination.

In operation O2, the LB 3 transmits the message data to the determined distribution destination (the relay apparatus 5A). Upon receiving the message data from the LB 3, the relay apparatus 5A extracts data (referred to as identifier data) of an identifier from the message data in accordance with a predetermined identification rule, and searches the transfer rule data held by the relay apparatus 5A by using the extracted identifier data. Assume that the transfer destination corresponding to the extracted identifier data has not been set in the transfer rules. The relay apparatus 5A determines a transfer destination through autonomous load balancing. It is assumed, in the present embodiment, that the relay apparatus 5A has determined the APL server 7A to be the transfer destination.

In operation O3, the relay apparatus 5A transmits the message data to the determined transfer destination (APL server 7A).

In operation O4, the relay apparatus 5A transmits transfer rule notification data including transfer destination information to each of the relay apparatuses 5B and 5C. The transfer destination information includes the extracted identifier data and data (referred to as address data) of an address of the determined transfer destination server (APL server 7A). Upon receiving the transfer rule notification data from the relay apparatus 5A, each of the relay apparatuses 5B and 5C updates the transfer rule data held therein. In the present embodiment, either the relay apparatus 5B or the relay apparatus 5C transmits acknowledgment data for the transfer rule notification data to the relay apparatus 5A, which will be discussed in detail later.

In operation O5, the client 1B transmits message data to the LB 3. Assume that this message data includes identical identifier data to that included in the message data transmitted in operation O1. Upon receiving the message data received from the client 1A, the LB 3 determines a distribution destination by using various types of load balancing algorithms. It is assumed, in the present embodiment, that the LB 3 has determined the relay apparatus 5B to be the distribution destination.

In operation O6, the LB 3 transmits the message data to the determined distribution destination (the relay apparatus 5B).

Upon receiving the message data received from the LB 3, the relay apparatus 5B extracts the identifier data from the message data in accordance with the predetermined identification rule, and searches the transfer rule data held by the relay apparatus 5B by using the extracted identifier data. Since the relay apparatus 5B has received the transfer rule notification data from the relay apparatus 5A in operation O4, the relay apparatus 5B determines the APL server 7A to be the transfer destination.

In operation O7, the relay apparatus 5B transmits the message data to the determined transfer destination, i.e., APL server 7A. Thus, the relay apparatuses 5 may hold identical transfer rule data without exclusive control.

Figure 3:
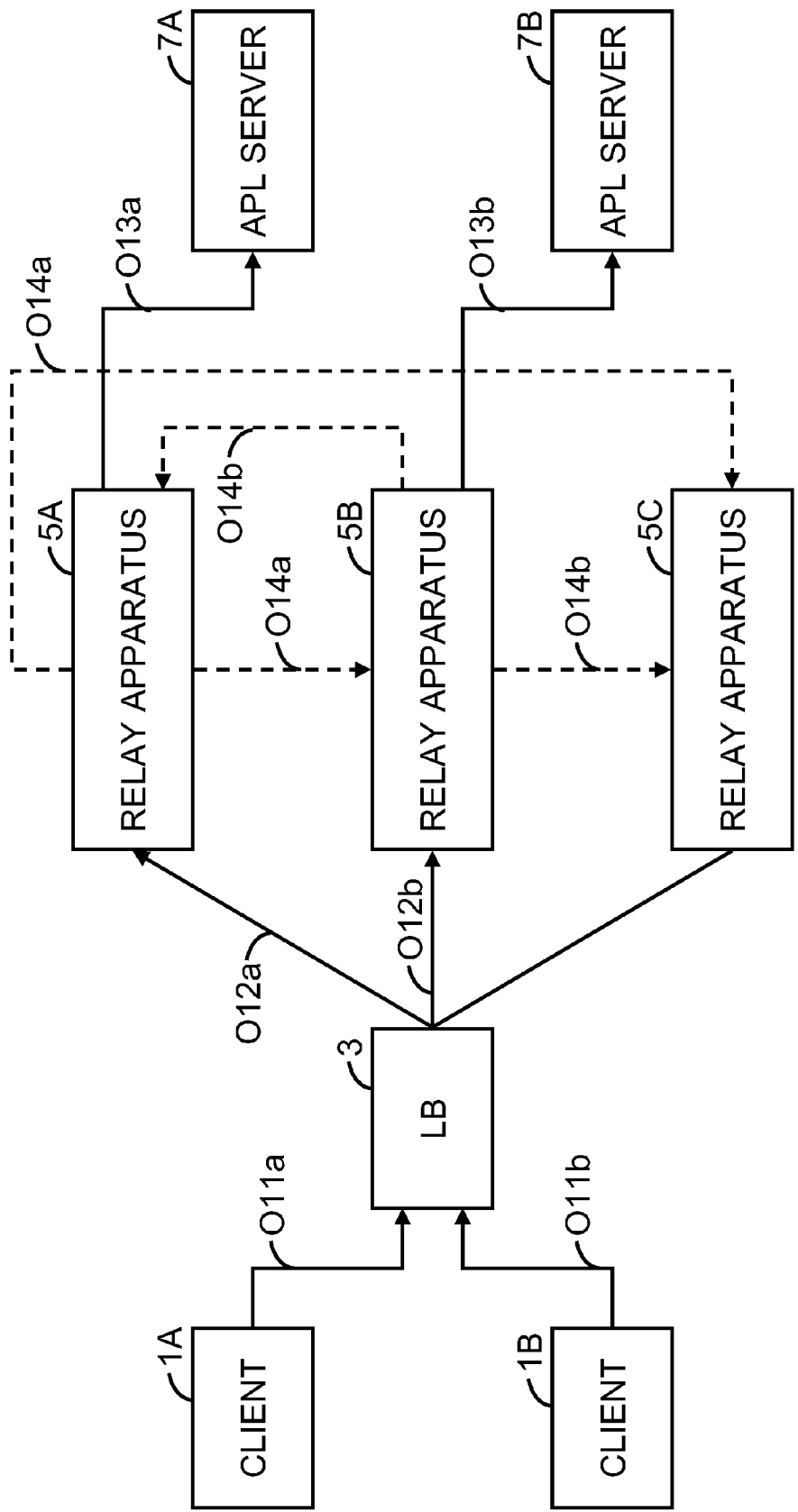
FIG. 3 is a diagram illustrating an example of operations of a system according to an embodiment of the present invention.

However, when the relay apparatuses 5 receive the message data at almost the same time, the transfer rules of the relay apparatuses 5 may conflict with each other. FIG. 3 illustrates an example where the transfer rules conflict with each other.

In operations O11*a* and O11*b*, the client 1A and the client 1B transmit message data at almost the same time. Each of the message data includes new identical identifier data. Upon receiving the message data from each of the clients 1A and 1B, the LB 3 determines a distribution destination for the respective message data by using various types of load balancing algorithms. It is assumed, in the present embodiment, that the LB 3 has determined the relay apparatus 5A to be the distribution destination for the message data received from the client 1A, and the relay apparatus 5B to be the distribution destination for the message data received from the client 1B.

In operation O12*a*, the LB 3 transmits the message data received from the client 1A to the determined distribution destination (the relay apparatuses 5A).

Upon receiving the message data from the LB 3, the relay apparatus 5A extracts the identifier data from the message data in accordance with the predetermined identification rule, and searches the transfer rule data held by the relay apparatus 5A by using the extracted identifier data. Assume that the transfer destination corresponding to the extracted identifier data has not been set in the transfer rules. The relay apparatus 5A determines a transfer destination through autonomous load balancing. It is assumed, in the present embodiment, that the relay apparatus 5A has determined the APL server 7A to be the transfer destination.

In operation O13*a*, the relay apparatus 5A transmits the message data to the determined transfer destination (APL server 7A).

In operation O14*a*, the relay apparatus 5A transmits transfer rule notification data including transfer destination information to each of the relay apparatuses 5B and 5C. The transfer destination information includes the extracted identifier data and address data of the determined transfer destination server (APL server 7A).

In operation O12*b*, the LB 3 transmits the message data received from the client 1B to the determined distribution destination (the relay apparatuses 5B).

The relay apparatus 5B receives the message data from the LB 3 at almost the same time as when the relay apparatus 5A receives the message data from the LB 3. Upon receiving the message data from the LB 3, the relay apparatus 5B extracts the identifier data from the message data in accordance with the predetermined identification rule, and searches the transfer rule data held by the relay apparatus 5B by using the extracted identifier data. Since the transfer rule notification data has not yet been received from the relay apparatus 5A, the transfer destination corresponding to the extracted identifier data has not yet been set in the transfer rules. The relay apparatus 5B determines a transfer destination through the autonomous load balancing. It is assumed, in the present embodiment, that the relay apparatus 5B has determined the APL server 7B to be the transfer destination.

In operation O13*b*, the relay apparatus 5B transmits the message data to the determined transfer destination (APL server 7B).

In operation O14*b*, the relay apparatus 5B transmits transfer rule notification data including transfer destination information to each of the relay apparatuses 5A and 5C. The transfer destination information includes the extracted identifier data and address data of the determined transfer destination server (the APL server 7B).

Figure 4:
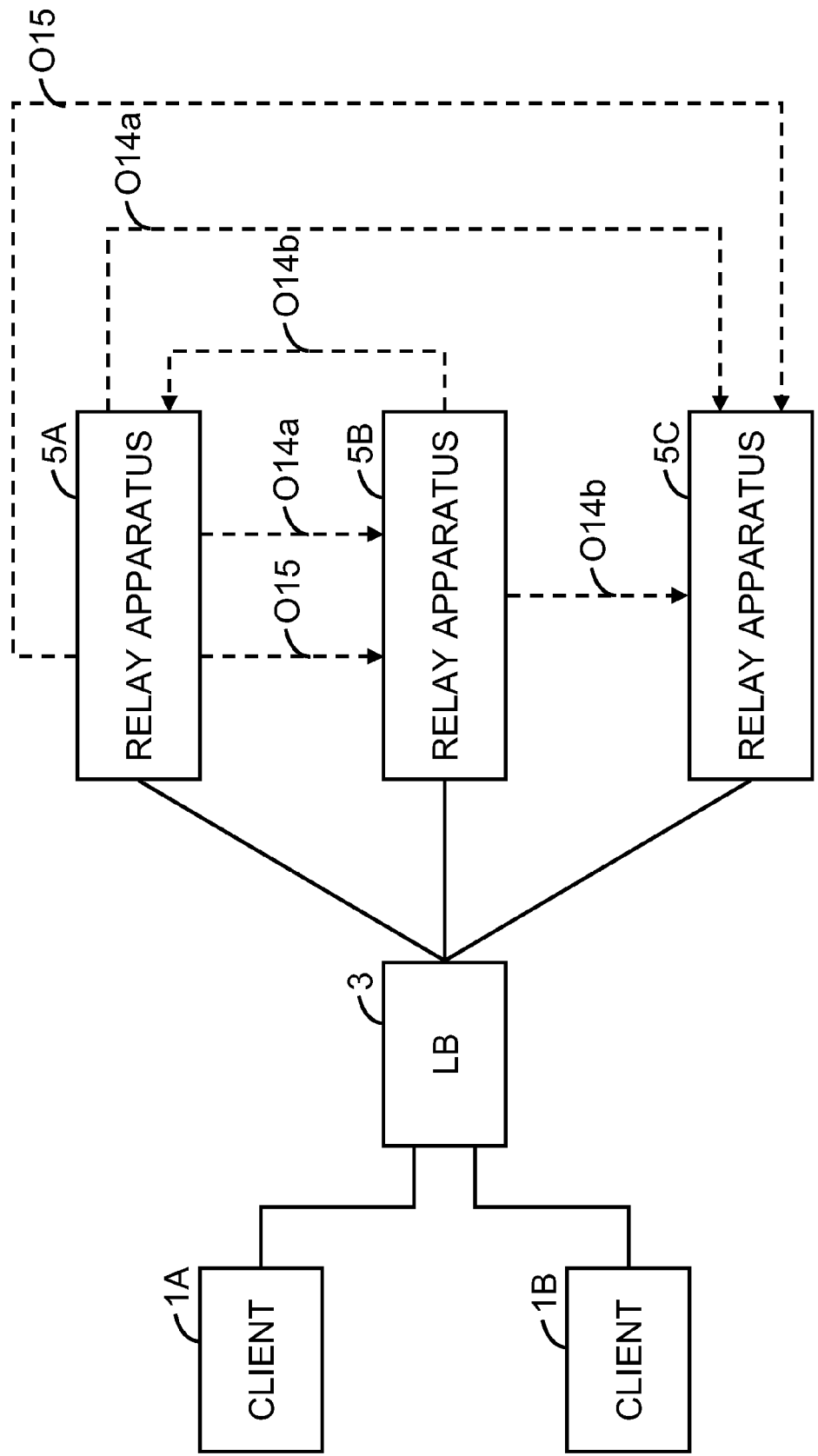
FIG. 4 is a diagram illustrating an example of operations of a system according to an embodiment of the present invention.

Thus, when the message data is transmitted to each of the relay apparatuses 5 at almost the same time, the transfer rules held by the relay apparatuses 5 may conflict with each other. In the present embodiment, therefore, the relay apparatuses 5 (5A and 5B in FIG. 3) which had determined a new transfer destination through the autonomous load balancing may resolve the conflict. FIG. 4 illustrates an example of resolving the conflict.

In operations O14*a* and O14*b*, each of the relay apparatuses 5A and 5B transmits the transfer rule notification data. Then, each of the relay apparatuses 5A and 5B selects the transfer destination information to be used between those of the relay apparatus 5A and the relay apparatus 5B.

In operation O15, the relay apparatus 5 (5A in FIG. 4) of the selected transfer destination information retransmits the transfer rule notification data to the other relay apparatuses 5. Then, the other relay apparatuses 5 update the transfer rule data held therein in accordance with the retransmitted transfer rule notification data. Thus, the above-discussed conflict between the transfer rules may be resolved.

Figure 5:
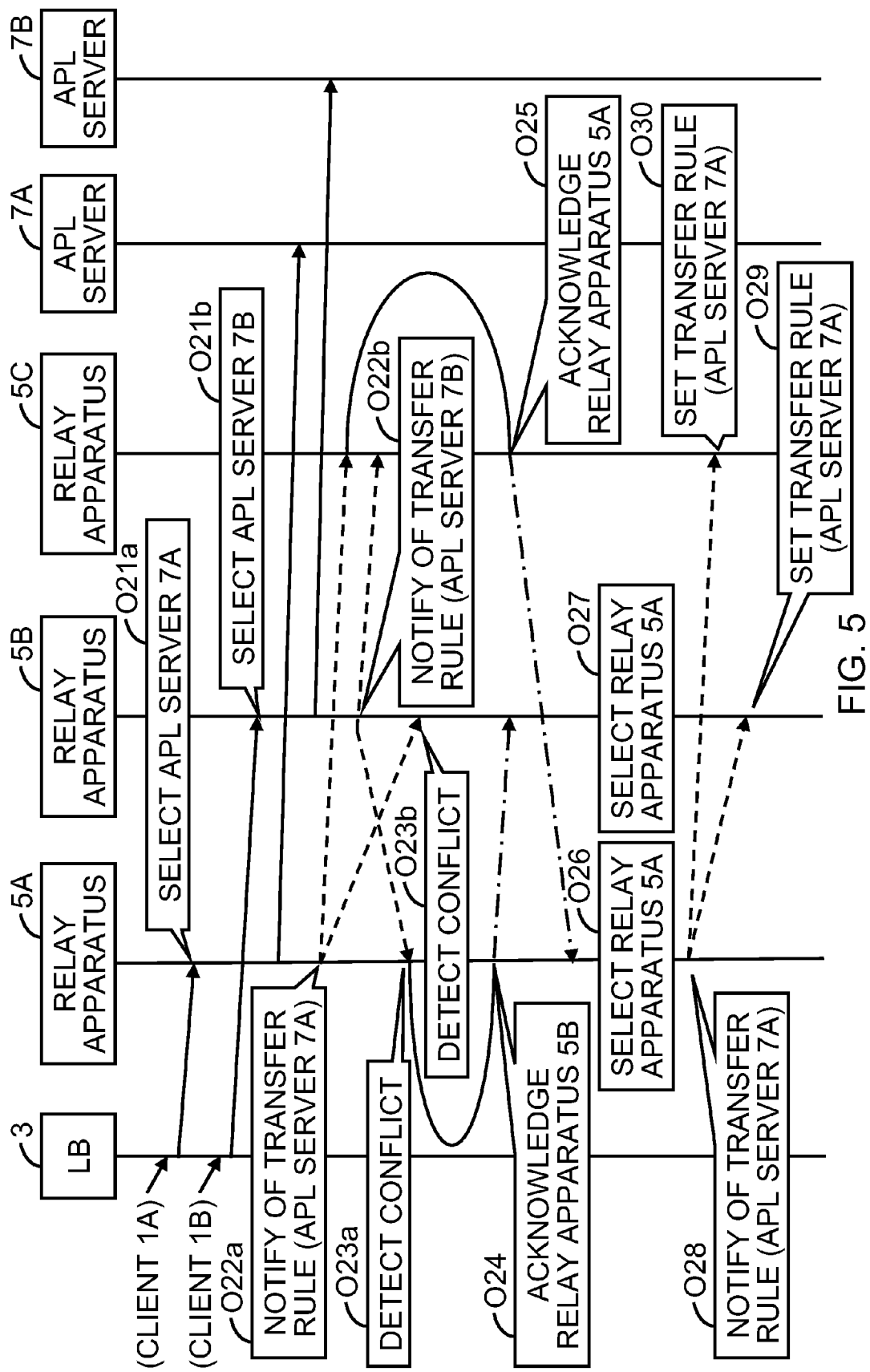
FIG. 5 is a diagram illustrating an example of a sequence of operations in an entire system according to an embodiment of the present invention.

FIG. 5 illustrates a sequence of operations of the entire system discussed with reference to FIGS. 3 and 4. In FIG. 5, a solid arrow indicates the client message data, a dashed arrow indicates the transfer rule notification data, and a dashed-dotted arrow indicates the acknowledgment data for transfer rule notification data.

In operation O21*a*, the relay apparatus 5A receives message data from the client 1A, and determines a transfer destination (the APL server 7A).

In operation O22*a*, the relay apparatus 5A transmits the transfer rule notification data (the transfer destination: the APL server 7A) to each of the relay apparatuses 5B and 5C.

In operation O21*b*, the relay apparatus 5B receives message data from the client 1B almost the same time as when the relay apparatus 5A receives the message data from the client 1A, and determines a transfer destination (the APL server 7B).

In operation O22*b*, the relay apparatus 5B transmits the transfer rule notification data (the transfer destination: the APL server 7B) to each of the relay apparatuses 5A and 5C.

In operation O23*a*, the relay apparatus 5A detects conflict between the transfer rules upon receiving the transfer rule notification data (the transfer destination: the APL server 7B) from the relay apparatus 5B.

In operation O23*b*, the relay apparatus 5B also detects conflict between the transfer rules upon receiving the transfer rule notification data (the transfer destination: the APL server 7A) from the relay apparatus 5A.

In operation O24, it is assumed that the relay apparatus 5A transmits acknowledgment data to the relay apparatus 5B, the relay apparatus 5B transmits acknowledgment data to the relay apparatus 5C, and the relay apparatus 5C transmits acknowledgment data to the relay apparatus 5A in the example illustrated in FIG. 5. Therefore, the relay apparatus 5A transmits acknowledgment data for the transfer rule notification data received from the relay apparatus 5B.

In operation O25, the relay apparatus 5C transmits acknowledgment data for the transfer rule notification data received from the relay apparatus 5A. Since the relay apparatus 5C transmits no transfer rule notification data in FIG. 5, the relay apparatus 5B transmits no acknowledgment data for transfer rule notification data.

In operation O26, upon receiving the acknowledgment data from the relay apparatus 5C, the relay apparatus 5A selects either the relay apparatus 5A or the relay apparatus 5B in a predetermined manner. Assume that the relay apparatus 5A is selected in the present embodiment.

In operation O27, upon receiving the acknowledgment data from the relay apparatus 5A, the relay apparatus 5B selects either the relay apparatus 5A or the relay apparatus 5B in the same manner. Thus, the relay apparatus 5A is selected.

In operation O28, the relay apparatus 5A determines that the transfer destination information thereof is adopted, and retransmits the transfer rule notification data (the transfer destination: the APL server 7A) to each of the relay apparatuses 5B and 5C.

In operations O29 and O30, each of the relay apparatuses 5B and 5C receives the transfer rule notification data (the transfer destination: The APL server 7A) from the relay apparatus 5A, and stores the transfer destination information in the respective transfer rule storage.

Thus, the transfer rules stored in the relay apparatuses 5A, 5B, and 5C may be synchronized, and data of a series of messages having the identical identifier data may be transferred to the APL server 7A. It is assumed that the system according to the present embodiment is configured to allow the conflict among the transfer rules for a short time period. Thus, the above-discussed conflict among the transfer rules is insignificant for the system although the conflict among the transfer rules continues over the time period corresponding to operations O21b to O29.

Figure 25:
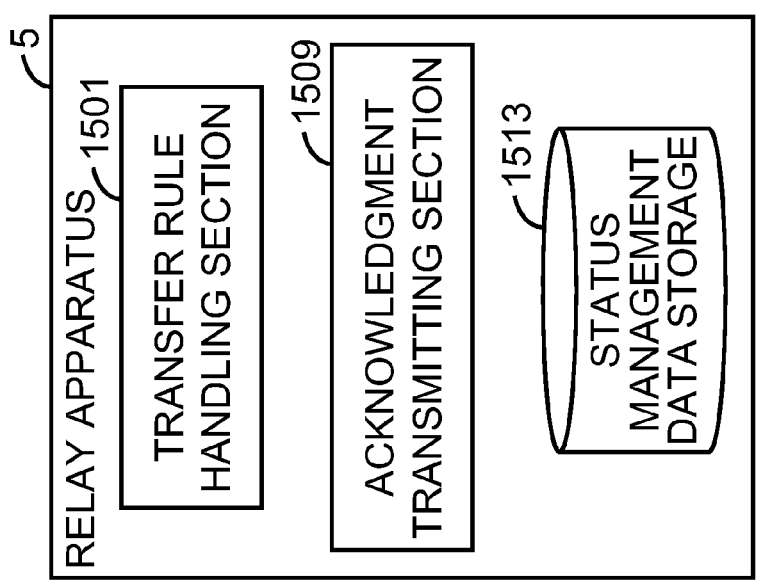
FIG. 25 is a diagram illustrating an example of a functional configuration of a relay apparatus according to an embodiment of the present invention.
Figure 27:
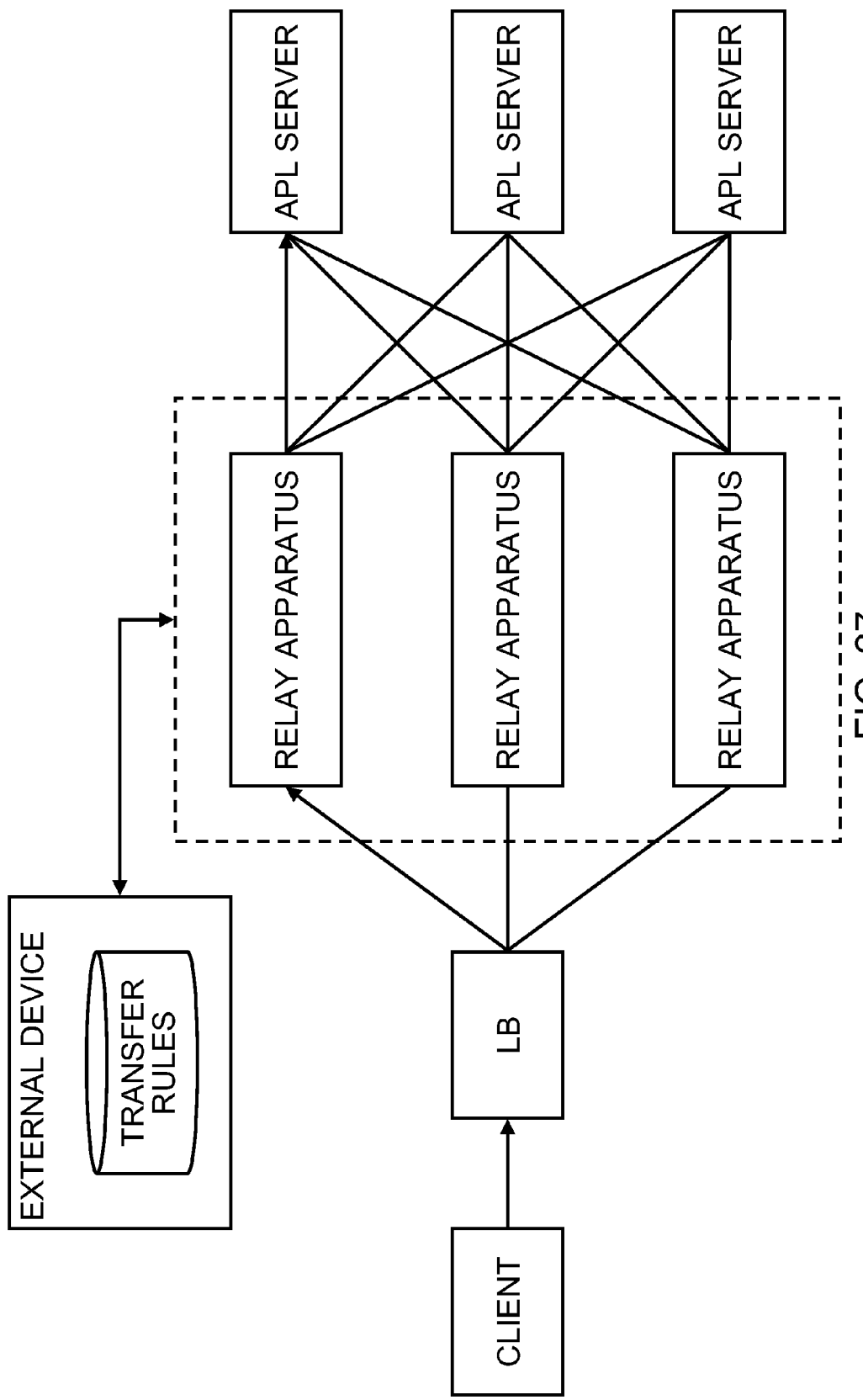
FIG. 27 is a diagram illustrating an example of a system including a plurality of relay apparatuses.

FIG. 25 illustrates an example of a functional configuration of a relay apparatus according to the present embodiment. The relay apparatus 5 includes a transfer rule handling section 1501, an acknowledgment transmitting section 1509, and a status management data storage 1513.

Figure 26:
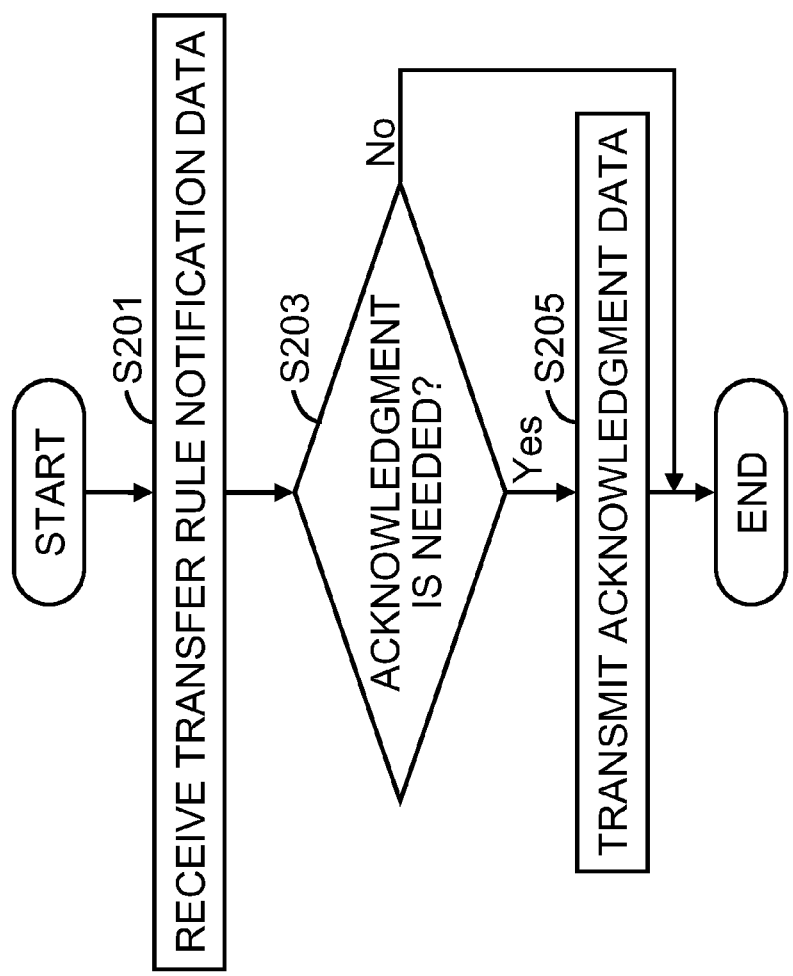
FIG. 26 is a diagram illustrating an example of an operation flow of a relay apparatus according to an embodiment of the present invention.

FIG. 26 illustrates an example of an operation flow of a relay apparatus according to the present embodiment.

In operation S201, the transfer rule handling section 1501 receives transfer rule notification data.

In operation S203, the transfer rule handling section 1501 determines whether to transmit the acknowledgment data for the received transfer rule notification data in accordance with data of an acknowledgment necessity table stored in the status management data storage 1513.

In operation S205, when the acknowledgment data should be transmitted ("Yes" in operation S203), the acknowledgment transmitting section 1509 transmits the acknowledgment data.

Figure 6:
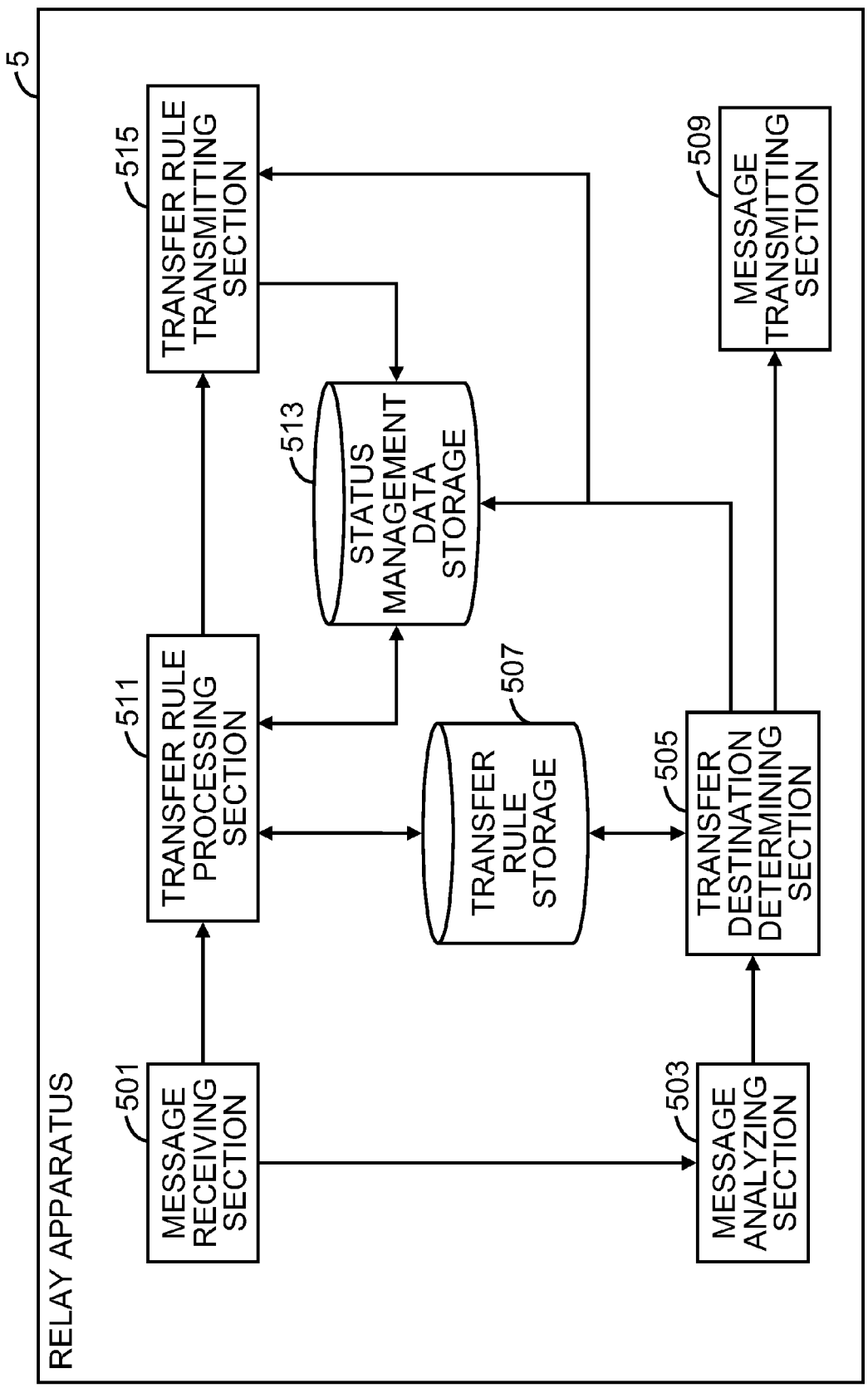
FIG. 6 is a diagram illustrating an example of a functional configuration of a relay apparatus according to an embodiment of the present invention.

The relay apparatus 5 performing the above-discussed operations will be discussed in detail with reference to FIGS. 6 to 24. FIG. 6 illustrates a functional configuration of the relay apparatus 5 according to the present embodiment. The relay apparatus 5 includes a message receiving section 501, a message analyzing section 503, a transfer destination determining section 505, a transfer rule storage 507, a message transmitting section 509, a transfer rule processing section 511, a status management data storage 513, and a transfer rule transmitting section 515.

The message receiving section 501 receives message data from the LB 3 and either transfer rule notification data or acknowledgment data from other relay apparatuses 5, and distributes operations in accordance with a reception port. When the reception port is a port for client message data, the message receiving section 501 sends the received client message data to the message analyzing section 503. When the reception port is a port for a control message data, the message receiving section 501 sends the received control message data to the transfer rule processing section 511.

Upon receiving message data from the message receiving section 501, the message analyzing section 503 extracts identifier data from the received message data in accordance with a predetermined identification rule, and sends the received message data and the extracted identifier data to the transfer destination determining section 505. Upon receiving the message data and the identifier data from the message analyzing section 503, the transfer destination determining section 505 searches the transfer rule storage 507 by using the received identifier data. When the received identifier data has already been registered in the transfer rule storage 507, the transfer destination determining section 505 acquires address data of the APL server 7 as the transfer destination from the transfer rule storage 507, and sends the received message data and the acquired address data of the APL server 7 to the message transmitting section 509. When the received identifier data has not been registered in the transfer rule storage 507, the transfer destination determining section 505 determines the APL server 7 to be the transfer destination, and registers address data of the determined APL server 7 in the transfer rule storage 507. The transfer destination determining section 505 registers data indicating status of the transfer rule in the status management data storage 513 and instructs the transfer rule transmitting section 515 to transmit transfer rule notification data. Upon receiving the message data and the address data of the APL server 7 from the transfer destination determining section 505, the message transmitting section 509 transmits the message data to the address of the APL server 7.

Upon receiving the message data from the message receiving section 501, the transfer rule processing section 511 stores data relating to the transfer rule in the transfer rule storage 507 and the status management data storage 513, and performs operations relating to the transfer rule in accordance with the data stored in the transfer rule storage 507 and the status management data storage 513. The transfer rule processing section 511 instructs as appropriate the transfer rule transmitting section 515 to transmit control message data. The transfer rule transmitting section 515 transmits transfer rule notification data or acknowledgment data in accordance with the instruction from the transfer destination determining section 505 or the transfer rule processing section 511.

FIG. 7 illustrates exemplary data stored in the transfer rule storage 507 according to the present embodiment. In the example illustrated in FIG. 7, a record of the transfer rule storage 507 includes an "identifier" column and a "transfer destination address" column. The "identifier" column stores an identifier data of the APL server 7. For example, "APL-a", "APL-b", and "APL-c" are identifiers of the APL server 7A, the APL server 7B, and the APL server 7C, respectively. The "transfer destination address" column stores address data of the APL server 7 as the transfer destination of the message data including identifier data stored in the corresponding "identifier" column.

The status management data storage 513 stores data of a status management table, an acknowledgment necessity table, and a conflict list. FIG. 8 illustrates exemplary data of the status management table stored in the status management data storage 513 according to the present embodiment. In the example illustrated in FIG. 8, a record of the status management table includes an "identifier" column, a "self determination flag" column, and an "acknowledgment expectation flag" column. The self determination flag indicates whether or not the transfer destination corresponding to the identifier has been determined by its own relay apparatus (hereinafter often abbreviated as an own apparatus) (ON: determined by its own apparatus, OFF: determined by another apparatus). The acknowledgment expectation flag indicates whether or not the relay apparatus is in the status of waiting for acknowledgment data for transfer rule notification data relating to the identifier (ON: in the waiting state, OFF: not in the waiting state).

Each of FIGS. 9A to 9F illustrates exemplary data of the acknowledgment necessity table stored in the status management data storage 513 of each of the relay apparatuses 5 illustrated in FIG. 10. More specifically, FIG. 9A illustrates data of the acknowledgment necessity table stored in the status management data storage 513 of the relay apparatus 5 having an apparatus number "1". FIG. 9B illustrates data of the acknowledgment necessity table stored in the status management data storage 513 of the relay apparatus 5 having an apparatus number "2". FIG. 9C illustrates data of the acknowledgment necessity table stored in the status management data storage 513 of the relay apparatus 5 having an apparatus number "3". FIG. 9D illustrates data of the acknowledgment necessity table stored in the status management data storage 513 of the relay apparatus 5 having an apparatus number "4". FIG. 9E illustrates data of the acknowledgment necessity table stored in the status management data storage 513 of the relay apparatus 5 having an apparatus number "5". FIG. 9F illustrates data of the acknowledgment necessity table stored in the status management data storage 513 of the relay apparatus 5 having an apparatus number "6". According to each of FIGS. 9A to 9F, the data of the acknowledgment necessity table includes an "apparatus number" column, an "apparatus number of acknowledgment destination" column, and an "apparatus number of acknowledgment source" column. The "apparatus number of acknowledgment destination" column stores an apparatus number of the relay apparatus 5 to which the relay apparatus 5 having the apparatus number stored in the "apparatus number" column transmits acknowledgment data. The "apparatus number of acknowledgment source" column stores an apparatus number of the relay apparatus 5 from which the relay apparatus 5 having the apparatus number stored in the "apparatus number" column receives acknowledgment data.

As illustrated in FIGS. 9A to 9F, the data of the acknowledgment necessity table stored in the status management data storage 513 differs among relay apparatuses 5. According to FIGS. 9A to 9F, settings on the acknowledgment necessity tables do not overlap one another so that each of the relay apparatuses 5 receives acknowledgment data from only one of the other relay apparatuses 5. For example, FIG. 9A illustrates that the relay apparatus 5 having the apparatus number "1" should transmits the acknowledgment data upon receiving the transfer rule notification data from the relay apparatus 5 having the apparatus number "2". Further, FIG. 9A illustrates that the relay apparatus 5 having the apparatus number "1" receives the acknowledgment data from the relay apparatus 5 having the apparatus number "6".

FIG. 11 illustrates exemplary data of the conflict list stored in the status management data storage 513 of each of the relay apparatuses 5 illustrated in FIG. 12. The data of the conflict list will be discussed with reference to FIG. 12. FIG. 12 illustrates a case where conflict among the transfer rules occurs because each of the three relay apparatuses 5 having the apparatus numbers "3", "4", and "5" out of six relay apparatuses 5 determines the transfer destination through the autonomous load balancing. In FIG. 12, a group including the relay apparatuses 5 (namely, the relay apparatuses having the respective apparatus numbers "3", "4", and "5") that cause the conflict among the transfer rules is referred to as a conflict resolution group. The apparatus numbers of the relay apparatuses 5 included in the conflict resolution group are registered in the conflict list. Each of the relay apparatuses 5 included in the conflict resolution group is provided with a number in group, and the number in group is registered in the conflict list. Each of the relay apparatuses 5 included in the conflict resolution group stores data of the identical conflict list. On the other hand, the conflict list of the relay apparatus 5 that is not included in the conflict resolution group is empty.

Figure 13:
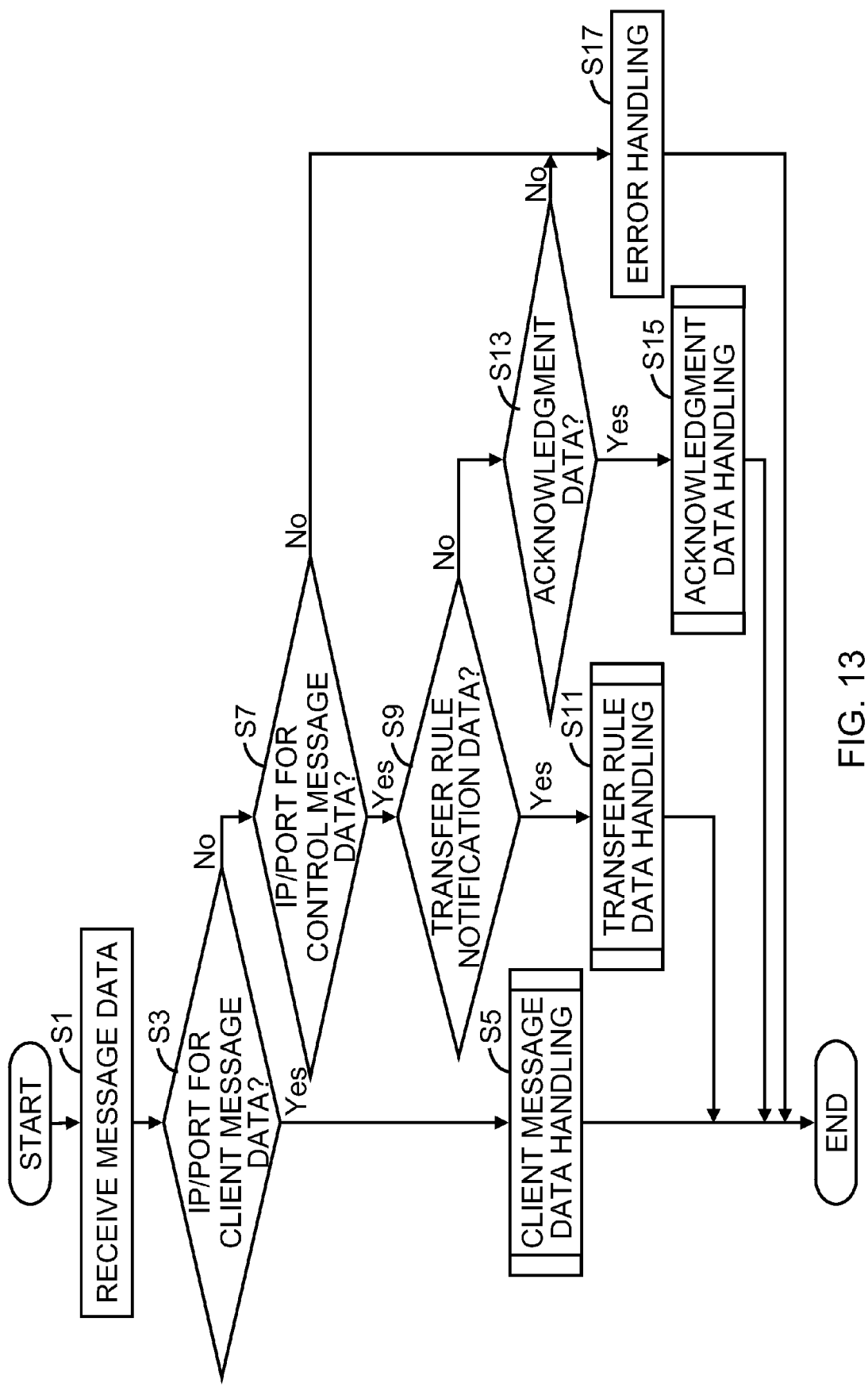
FIG. 13 is a diagram illustrating an example of an operation flow of an entire relay apparatus according to an embodiment of the present invention.

Operations performed by the relay apparatus 5 will be discussed with reference to FIGS. 13 to 24. FIG. 13 illustrates an example of an operation flow of an entire relay apparatus according to the present embodiment.

In operation S1, the message receiving section 501 of the relay apparatus 5 receives message data via an Internet Protocol (IP)/Port.

In operation S3, the message receiving section 501 determines whether the message data has been received via an IP/Port for client message data.

In operation S5, when the message data has been received via the IP/Port for client message data ("Yes" in operation S3), the relay apparatus 5 performs operations for handling client message data, and terminates the process. Operations for handling client message data will be discussed later in detail.

In operation S7, when the message data has been received via a port other than the IP/Port for client message data ("No" in operation S3), the message receiving section 501 determines whether the message data has been received via an IP/Port for control message data.

In operation S9, when the message data has been received via the IP/Port for control message data ("Yes" in operation S7), the message receiving section 501 sends the received message data to the transfer rule processing section 511.

Upon receiving the message data from the message receiving section 501, the transfer rule processing section 511 determines whether the received message data is transfer rule notification data. The determination whether the received message data is transfer rule notification data may be made in accordance with data (referred to as message type data), included in the received message data, of a message type.

In operation S11, when the received message data is transfer rule notification data ("Yes" in operation S9), the relay apparatus 5 performs operations for handling transfer rule data, and terminates the process. Operations for handling transfer rule data will be discussed later in detail.

In operation S13, when the received message data is not transfer rule notification data ("No" in operation S9), the transfer rule processing section 511 determines whether the received message data is acknowledgment data. The determination whether the received message data is acknowledgment data may be made in accordance with the message type data included in the received message data.

In operation S15, when the received message data is acknowledgment data ("Yes" in operation S13), the relay apparatus 5 performs operations for handling acknowledgment data, and terminates the process. Operations for handling acknowledgment data will be discussed later in detail.

In operation S17, when it has been determined that the message data has been received via a port other than the IP/Port for control message data ("No" in operation S7), or when it is determined that the received message data is not acknowledgment data ("No" in operation S13), the relay apparatus 5 performs predetermined operations for error handling. For example, the relay apparatus 5 may notify an administrator terminal (not illustrated) of the error occurrence. Thereafter, the relay apparatus 5 terminates the process.

Figure 14:
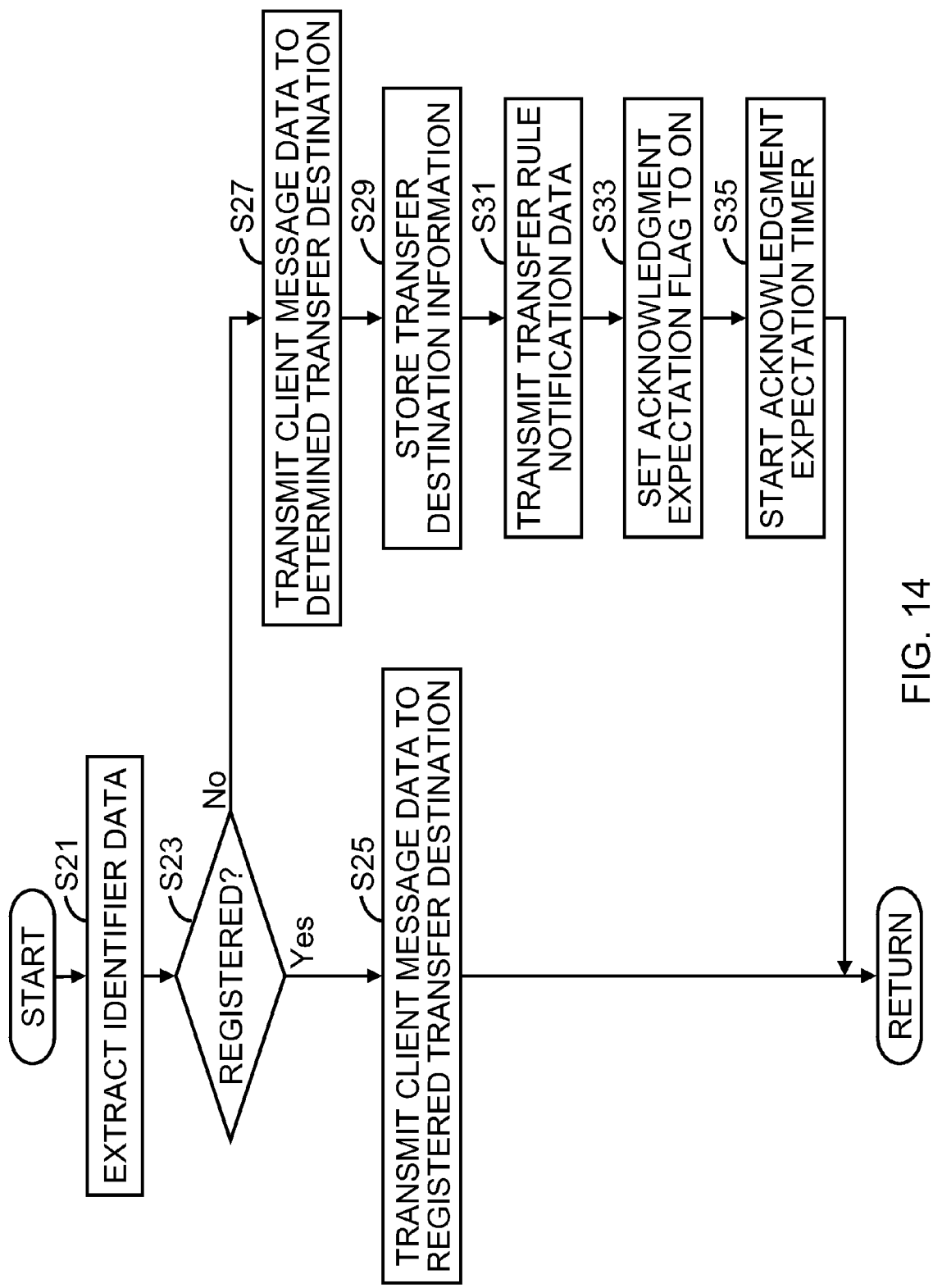
FIG. 14 is a diagram illustrating an example of an operation flow of handling client message data according to an embodiment of the present invention.

Operations for handling client message data performed in operation S5 of FIG. 13 will be discussed with reference to FIGS. 14 to 17. FIG. 14 illustrates an example of an operation flow of handling client message data according to the present embodiment. For example, the message receiving section 501 sends the received client message data to the message analyzing section 503. Examples of the client message data are illustrated in FIGS. 16 and 17. FIG. 16 illustrates an example of simple object access protocol (SOAP)/hyper text transfer protocol (HTTP) message data. FIG. 17 illustrates an example of HTTP message data.

In operation S21 of FIG. 14, the message analyzing section 503 extracts identifier data from the message data in accordance with a predetermined identification rule. It is assumed that the data of the identification rule has been stored in a storage or the like to which the message analyzing section 503 is accessible, for example. FIG. 15 illustrates exemplary data of the identification rule according to the present embodiment. As illustrated in FIG. 15, the identification rule provides, for each protocol, data specifying the location of the identifier data included in the message data. Since operation S21 does not constitute the primary part of the present embodiment, any more discussion on operation S21 will not be provided. The message analyzing section 503 sends the message data and the extracted identifier data to the transfer destination determining section 505.

In operation S23, upon receiving the message data and the identifier data from the message analyzing section 503, the transfer destination determining section 505 determines whether the identifier data extracted by the message analyzing section 503 has already been registered in the transfer rule storage 507.

In operation S25, when the identifier data extracted by the message analyzing section 503 has already been registered in the transfer rule storage 507 ("Yes" in operation S23), the transfer destination determining section 505 acquires address data of the transfer destination corresponding to the extracted identifier data from the transfer rule storage 507, and instructs the message transmitting section 509 to transmit the message data to the address of the transfer destination. The message transmitting section 509 transmits the message data to the address of the transfer destination in response to the instruction from the transfer destination determining section 505. Thereafter, the relay apparatus 5 terminates the process and returns to the original process.

In operation S27, when the identifier data extracted by the message analyzing section 503 has not been registered in the transfer rule storage 507 ("No" in operation S23), the transfer destination determining section 505 determines an APL server 7 to be the transfer destination of the message data including the identifier data through the autonomous load balancing, and instructs the message transmitting section 509 to transmit the message data to the address of the APL server 7 determined to be the transfer destination. The message transmitting section 509 transmits the message data to the address of the transfer destination in response to the instruction from the transfer destination determining section 505.

In operation S29, the transfer destination determining section 505 stores, in the transfer rule storage 507, transfer destination information including the identifier data extracted by the message analyzing section 503 and the address data of the APL server 7 determined to be the transfer destination in operation S27. Further, the transfer destination determining section 505 adds data (referred to as record data) of a record relating to the identifier data to the data of the status management table stored in the status management data storage 513. The transfer destination determining section 505 sets the self determination flag of the added record data to indicate the ON state.

In operation S31, the transfer destination determining section 505 instructs the transfer rule transmitting section 515 to transmit the transfer rule notification data including the additional transfer destination information to other relay apparatuses 5. The transfer rule transmitting section 515 transmits the transfer rule notification data to other relay apparatuses 5 by broadcasting in response to the instruction from the transfer destination determining section 505. FIG. 19 illustrates an example of transfer rule notification data according to the present embodiment. The transfer rule notification data illustrated in FIG. 19 includes the message type data ("transfer rule notification"), the identifier data extracted in operation S21, address data of the APL server 7 determined to be the transfer destination in operation S27 (that is, the transfer destination address), the apparatus number of own apparatus, and data of a conflict resolution flag ("OFF").

In operation S33, the transfer rule transmitting section 515 sets the acknowledgment expectation flag of the record data added to the data of the status management table stored in the status management data storage 513 in operation S29 to indicate the ON state.

In operation S35, the transfer rule transmitting section 515 starts an acknowledgment expectation timer. Thereafter, the relay apparatus 5 terminates the process and returns to the original process.

As discussed above, when one of the relay apparatuses 5 has determined a new transfer destination, the one of the relay apparatuses 5 notifies other relay apparatuses 5 of the new transfer destination by broadcasting. Thus, the transfer rule storages 507 may be synchronized.

Figure 18:
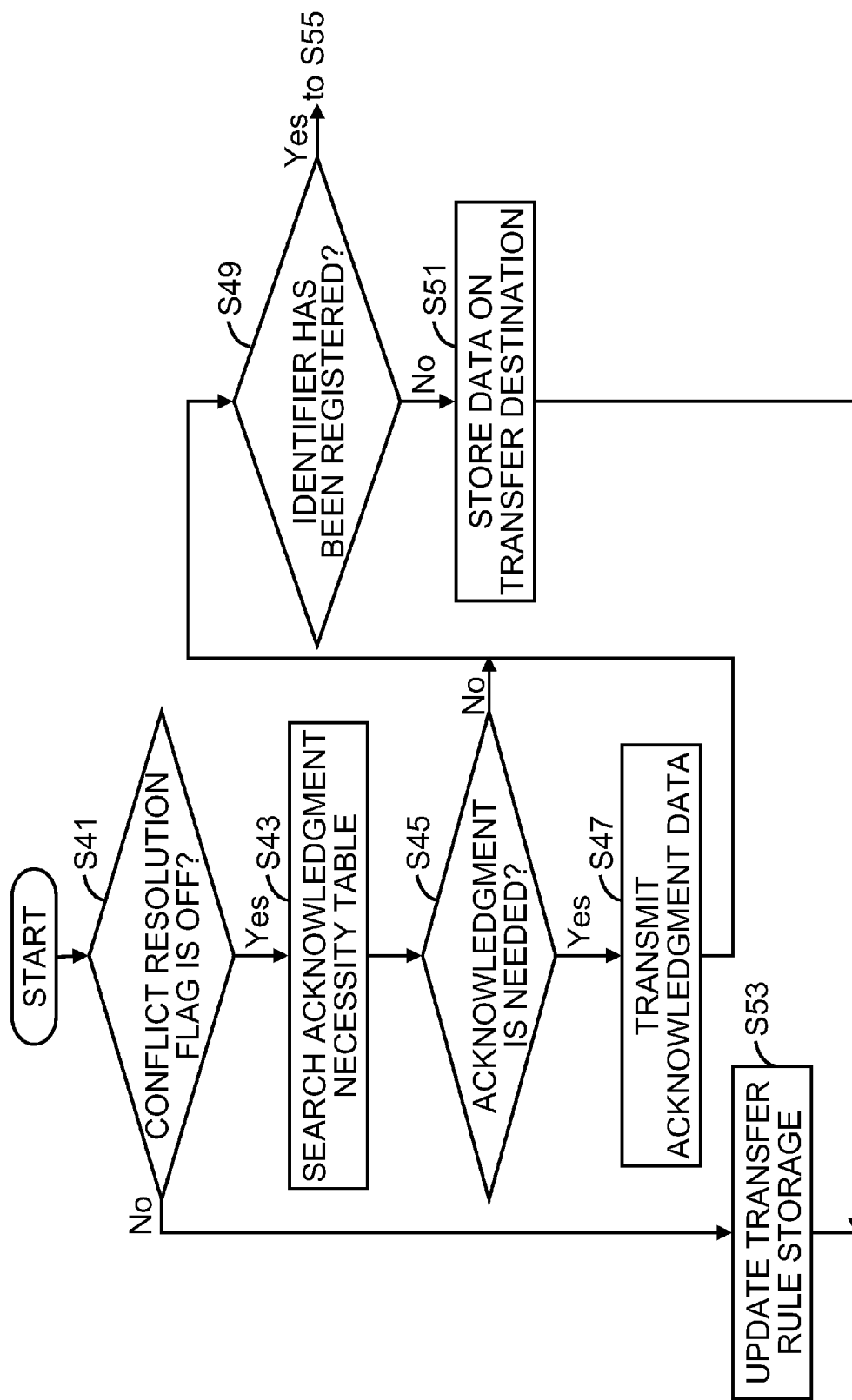
FIG. 18 is a diagram illustrating an example of an operation flow of handling transfer rule data according to an embodiment of the present invention.
Figure 22:
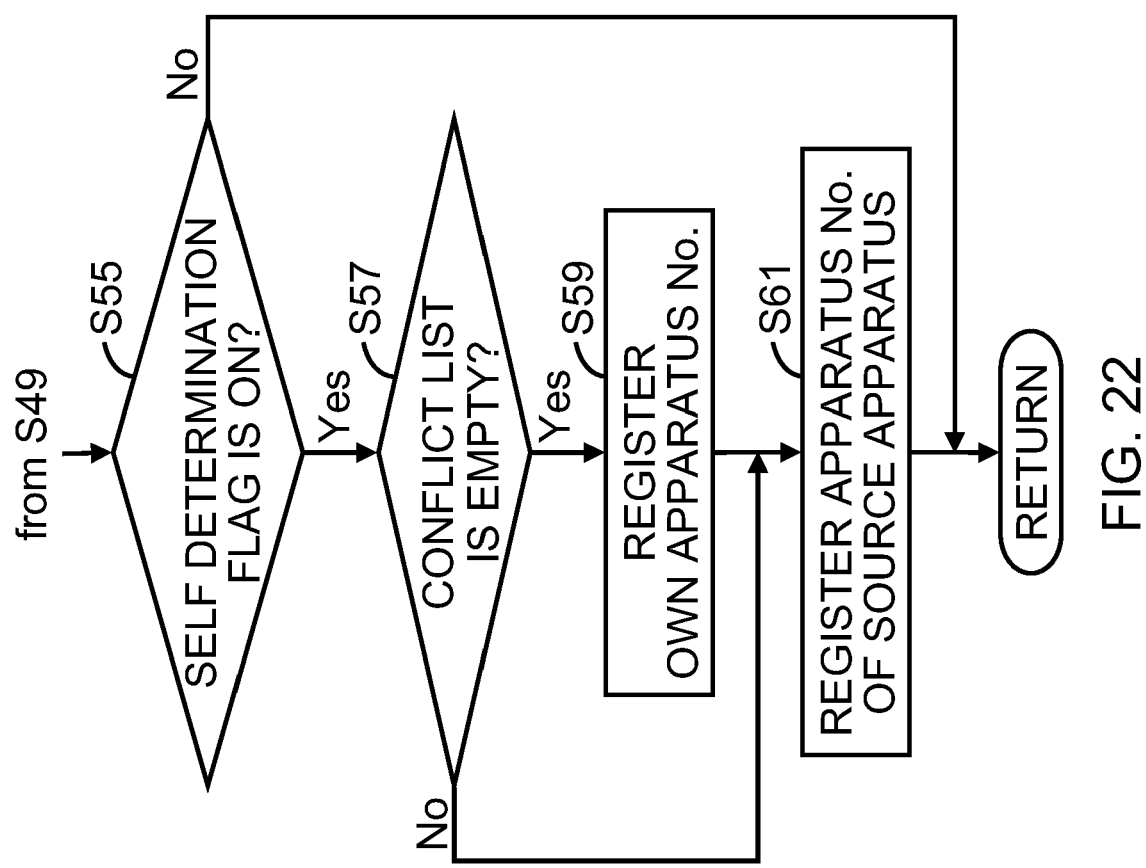
FIG. 22 is a diagram illustrating an example of an operation flow of handling transfer rule data according to an embodiment of the present invention.

Operations for handling transfer rule data performed in operation S11 of FIG. 13 will be discussed with reference to FIGS. 18 to 22. FIGS. 18 and 22 illustrate an example of an operation flow of handling transfer rule data according to the present embodiment.

In operation S41, the transfer rule processing section 511 determines whether the conflict resolution flag included in the transfer rule notification data indicates the OFF state. FIG. 19 illustrates an example of transfer rule notification data including data of the conflict resolution flag which indicates the OFF state. The transfer rule notification data illustrated in FIG. 19 includes the message type data ("transfer rule notification"), the identifier data, the address data of the transfer destination, the apparatus number of own apparatus, and data of the conflict resolution flag ("OFF"). As for the transfer rule notification data transmitted in operations O22a and O22b of FIG. 5, the conflict resolution flag is set to indicate the OFF state.

In operation S43, when the conflict resolution flag included in the transfer rule notification data indicates the OFF state ("Yes" in operation S41), the transfer rule processing section 511 searches the acknowledgment necessity table stored in the status management data storage 513 in accordance with the apparatus number of the relay apparatus 5 as the source apparatus of the transfer rule notification data, that is, the apparatus number included in the transfer rule notification data.

In operation S45, the transfer rule processing section 511 determines whether to transmit the acknowledgment data. Namely, the transfer rule processing section 511 determines whether the apparatus number of the relay apparatus 5 as the source apparatus of the transfer rule notification data has been stored in the "apparatus number of acknowledgment destination" column of the acknowledgment necessity table stored in the status management data storage 513. If the apparatus number has been stored in that column, the transfer rule processing section 511 determines that the acknowledgment data should be transmitted to the relay apparatus 5.

In operation S47, when the acknowledgment data should be transmitted to the relay apparatus 5 ("Yes" in operation S45), the transfer rule processing section 511 instructs the transfer rule transmitting section 515 to transmit the acknowledgment data to the relay apparatus 5 as the source apparatus of the transfer rule notification data. The transfer rule transmitting section 515 transmits the acknowledgment data to the relay apparatus 5 as the source apparatus of the transfer rule notification data in response to the instruction from the transfer rule processing section 511. FIG. 20 illustrates an example of the acknowledgment data for the transfer rule notification data according to the present embodiment. The acknowledgment data illustrated in FIG. 20 includes the message type data ("acknowledgment"), the identifier data, the address data of the transfer destination, and the apparatus number of own apparatus. As for the identifier data and the address data of the transfer destination, the data included in the transfer rule notification data may be copied, as it is. Thereafter, the relay apparatus 5 advances the process to operation S49.

When the acknowledgment data should not be transmitted ("No" in operation S45), the relay apparatus 5 skips operation S47 and advances the process to operation S49.

In operation S49, the transfer rule processing section 511 determines whether the identifier data included in the transfer rule notification data has been registered in the transfer rule storage 507. When the identifier data included in the transfer rule notification data has already been registered ("Yes" in operation S49), the relay apparatus 5 advances the process to operation S55 of FIG. 22.

In operation S51, when the identifier data included in the transfer rule notification data has not been registered ("No" in operation S49), the transfer rule processing section 511 stores the identifier data and the address data of the transfer destination that are included in the transfer rule notification data in the transfer rule storage 507, and adds record data relating to the identifier data to the data of the status management table stored in the status management data storage 513. The transfer rule processing section 511 sets the self determination flag and the acknowledgment expectation flag included in the record data to indicate the OFF state, respectively. Thereafter, the relay apparatus 5 terminates the process and returns to the original process.

In operation S53, when the conflict resolution flag included in the transfer rule notification data indicates the ON state ("No" in operation S41), the transfer rule processing section 511 updates the transfer rule storage 507. FIG. 21 illustrates an example of transfer rule notification data including data of the conflict resolution flag which indicates the ON state. The transfer rule notification data illustrated in FIG. 21 includes the message type data ("transfer rule notification"), the identifier data, the address data of the transfer destination, the apparatus number of own apparatus, data of the conflict resolution flag ("ON"), an amount of the relay apparatuses 5 included in the conflict resolution group, and the number of own apparatus in the conflict resolution group. As for the transfer rule notification data transmitted in operation O28 of FIG. 5, the conflict resolution flag is set to indicate the ON state.

The transfer rule processing section 511 updates the transfer rule storage 507 in accordance with the identifier data and the address data of the transfer destination that are included in the transfer rule notification data. More specifically, the transfer rule processing section 511 overwrites the address data of the transfer destination, that has been stored in the transfer rule storage 507, corresponding to the identifier data included in the transfer rule notification data with the address data of the transfer destination included in the transfer rule notification data. Each of the relay apparatuses 5 that has received the transfer rule notification data including data of the conflict resolution flag which indicates the ON state updates the transfer rule storage 507 thereof in accordance with the received transfer rule notification data so that the transfer rule storages 507 may be synchronized and the conflict among the transfer rules may be resolved. Thereafter, the relay apparatus 5 terminates the process and returns to the original process.

In operation S55 of FIG. 22, the transfer rule processing section 511 determines whether the self determination flag corresponding to the identifier data included in the transfer rule notification data indicates the ON state in the status management table stored in the status management data storage 513. When the self determination flag corresponding to the identifier data included in the transfer rule notification data indicates the OFF state in the status management table stored in the status management data storage 513 ("No" in operation S55), it is determined that its own apparatus does not belong to the conflict resolution group and the relay apparatus 5 skips operations S57 to S61. Then, the relay apparatus 5 terminates the process and returns to the original process.

In operation S57, when the self determination flag corresponding to the identifier data included in the transfer rule notification data indicates the ON state in the status management table stored in the status management data storage 513 ("Yes" in operation S55), it is determined that its own apparatus belongs to the conflict resolution group. Then, the transfer rule processing section 511 determines whether the data of the conflict list stored in the status management data storage 513 is empty. When the data of the conflict list stored in the status management data storage 513 is not empty ("No" in operation S57), the relay apparatus 5 skips operation S59 and advances the process to operation S61.

In operation S59, when the data of the conflict list stored in the status management data storage 513 is empty ("Yes" in operation S57), the transfer rule processing section 511 registers the apparatus number of its own apparatus in the conflict list. Then, the relay apparatus 5 advances the process to operation S61.

In operation S61, the transfer rule processing section 511 registers the apparatus number of the relay apparatus 5 as the source apparatus of the transfer rule notification data in the data of the conflict list stored in the status management data storage 513. Namely, for the first time, the apparatus number of its own apparatus is registered in the conflict list in addition to the apparatus number of the relay apparatus 5 as the source apparatus of the transfer rule notification data. For the second time or later, the apparatus number of only the relay apparatus 5 as the source apparatus of the transfer rule notification data is additionally registered in the conflict list. Thereafter, the relay apparatus 5 terminates the process and returns to the original process.

As discussed above, the acknowledgment data is transmitted only to the relay apparatus 5 registered in the acknowledgment necessity table stored in the status management data storage 513. Thus, the control message data (acknowledgment data) exchanged between the relay apparatuses 5 may be reduced.

Figure 23:
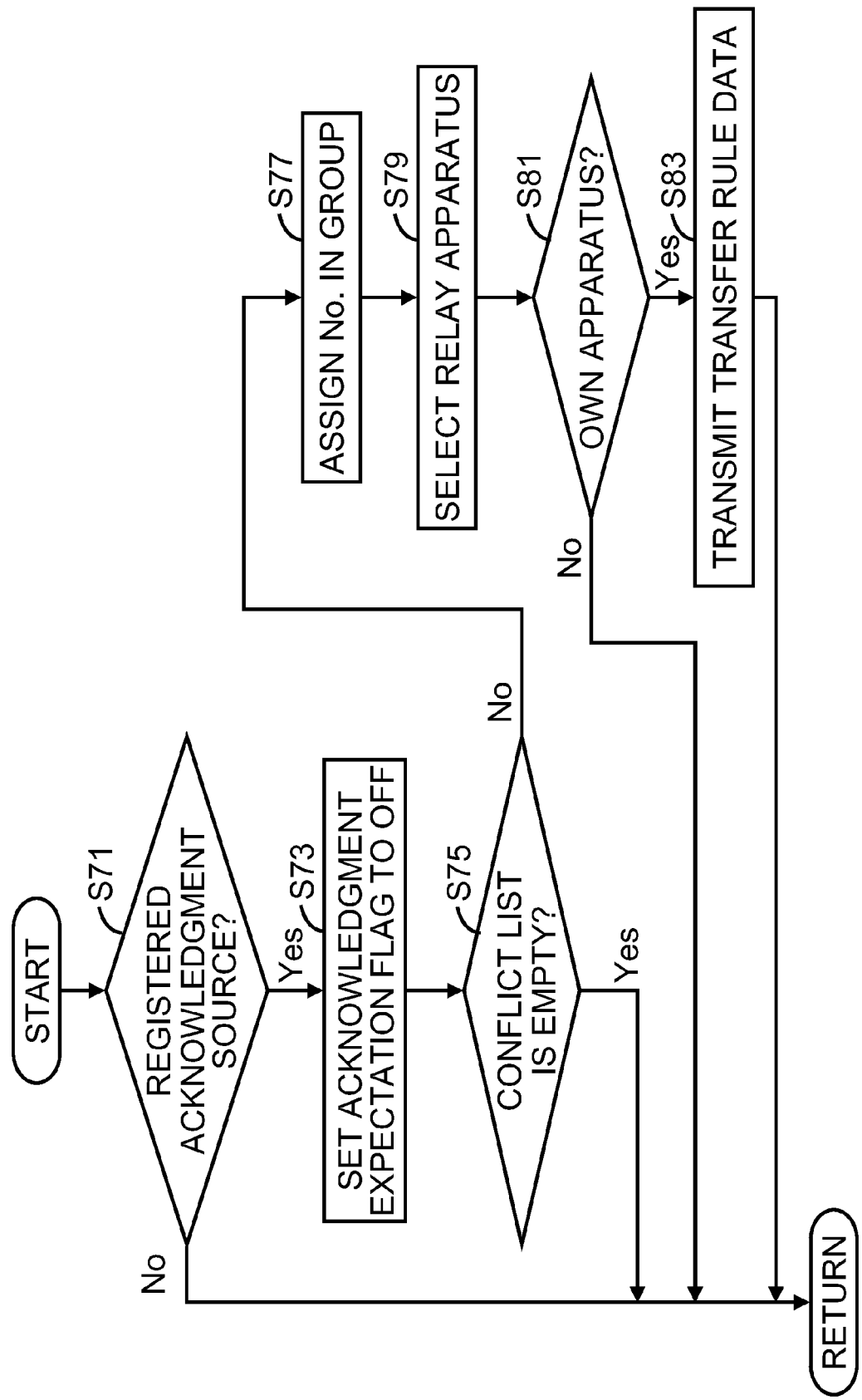
FIG. 23 is a diagram illustrating an example of an operation flow of handling acknowledgment data according to an embodiment of the present invention.

Operations for handling acknowledgment data performed in operation S15 of FIG. 13 will be discussed with reference to FIG. 23. FIG. 23 illustrates an example of an operation flow of handling acknowledgment data according to the present embodiment.

In operation S71, the transfer rule processing section 511 determines whether the source apparatus of the acknowledgment data has been registered as the acknowledgment source apparatus in the acknowledgment necessity table stored in the status management data storage 513. More specifically, the transfer rule processing section 511 determines whether the apparatus number of the relay apparatus 5 as the source apparatus of the acknowledgment data has been stored in the "apparatus number of acknowledgment source" column of the acknowledgment necessity table. When the source apparatus of the acknowledgment data has not been registered as the acknowledgment source apparatus in the acknowledgment necessity table stored in the status management data storage 513 ("No" in operation S71), the relay apparatus 5 skips operations S73 to S83. Then, the relay apparatus 5 terminates the process and returns to the original process.

In operation S73, when the source apparatus of the acknowledgment data has been registered as the acknowledgment source apparatus in the acknowledgment necessity table stored in the status management data storage 513 ("Yes" in operation S71), the transfer rule processing section 511 sets the acknowledgment expectation flag, that is included in the status management table stored in the status management data storage 513, corresponding to the identifier data included in the acknowledgment data to indicate the OFF state. Further, the transfer rule processing section 511 stops the acknowledgment expectation timer started in operation S35.

In operation S75, the transfer rule processing section 511 determines whether the conflict list is empty, that is, no apparatus number has been registered in the conflict list stored in the status management data storage 513. When the conflict list is empty ("Yes" in operation S75), it is determined that no conflict among the transfer rules has occurred and the relay apparatus 5 skips operations S77 to S83. Then, the relay apparatus 5 terminates the process and returns to the original process.

In operation S77, when the conflict list is not empty ("No" in operation S75), the transfer rule processing section 511 assigns a number in the conflict resolution group to each of the relay apparatuses 5 corresponding to the apparatus numbers registered in the conflict list. More specifically, the transfer rule processing section 511 sorts the apparatus numbers registered in the conflict list, and assigns serial numbers to the relay apparatuses 5 in the sorted order, with a predetermined value (e.g., 1) as an initial value. Since the numbers in conflict resolution group are assigned in each of the relay apparatuses 5 belonging to the conflict resolution group through the same method, the relay apparatuses 5 may hold data of the identical conflict list.

In operation S79, the transfer rule processing section 511 selects one of the relay apparatuses 5 listed up in the conflict list stored in the status management data storage 513 in accordance with a hash value (e.g., a remainder) of the identifier for which the conflict has occurred and the numbers in conflict resolution group. For example, when the conflict list includes the data illustrated in FIG. 11 and the hash value is "1", the relay apparatus 5 corresponding to the number "1" in the conflict resolution group, namely, the relay apparatus 5 corresponding to the apparatus number "3" may be selected.

Each of the relay apparatuses 5 selects a relay apparatus 5 in accordance with the identical conflict list through the same method. Thus, each of the relay apparatuses 5 may select the relay apparatus 5. Any other selection method may be used so long as the method allows a distributed selection such that independent selections provide the same result.

In operation S81, the transfer rule processing section 511 determines whether the relay apparatus 5 selected in operation S79 is its own apparatus.

In operation S83, when the relay apparatus 5 selected in operation S79 is its own apparatus ("Yes" in operation S81), it is determined that transfer rule notification data in which the conflict resolution flag is set to indicate the ON state should be transmitted to other relay apparatuses 5. Then, the transfer rule processing section 511 instructs the transfer rule transmitting section 515 to transmit the transfer rule notification data to other relay apparatuses 5 by broadcasting. The transfer rule transmitting section 515 transmits the transfer rule notification data to other relay apparatuses 5 by broadcasting in response to the instruction from the transfer rule processing section 511. In the transfer rule notification data, the transfer rule transmitting section 515 stores data of the identifier for which the conflict has occurred, and address data of the transfer destination, that is stored in the transfer rule storage 507, corresponding to the identifier. The transfer rule transmitting section 515 also stores, in the transfer rule notification data, the amount of the apparatus numbers registered in the conflict list stored in the status management data storage 513 as the amount of the relay apparatuses 5 included in the conflict resolution group, and further stores the number in the conflict resolution group of its own apparatus. Thereafter, the relay apparatus 5 terminates the process and returns to the original process.

When the relay apparatus 5 selected in operation S79 is not its own apparatus ("No" in operation S81), the relay apparatus 5 skips operation S83. Then, the relay apparatus 5 terminates the process and returns to the original process. In that case, therefore, the relay apparatus 5 waits for the relay apparatus 5 selected in operation S79 to transmit the transfer rule notification data in which the conflict resolution flag indicates the ON state.

Thus, the conflict among the transfer rules may be resolved. Since operations for handling acknowledgment data may be started without waiting for receiving all of the acknowledgment data from other relay apparatuses 5, time for waiting the acknowledgment data may be reduced.

Figure 24:
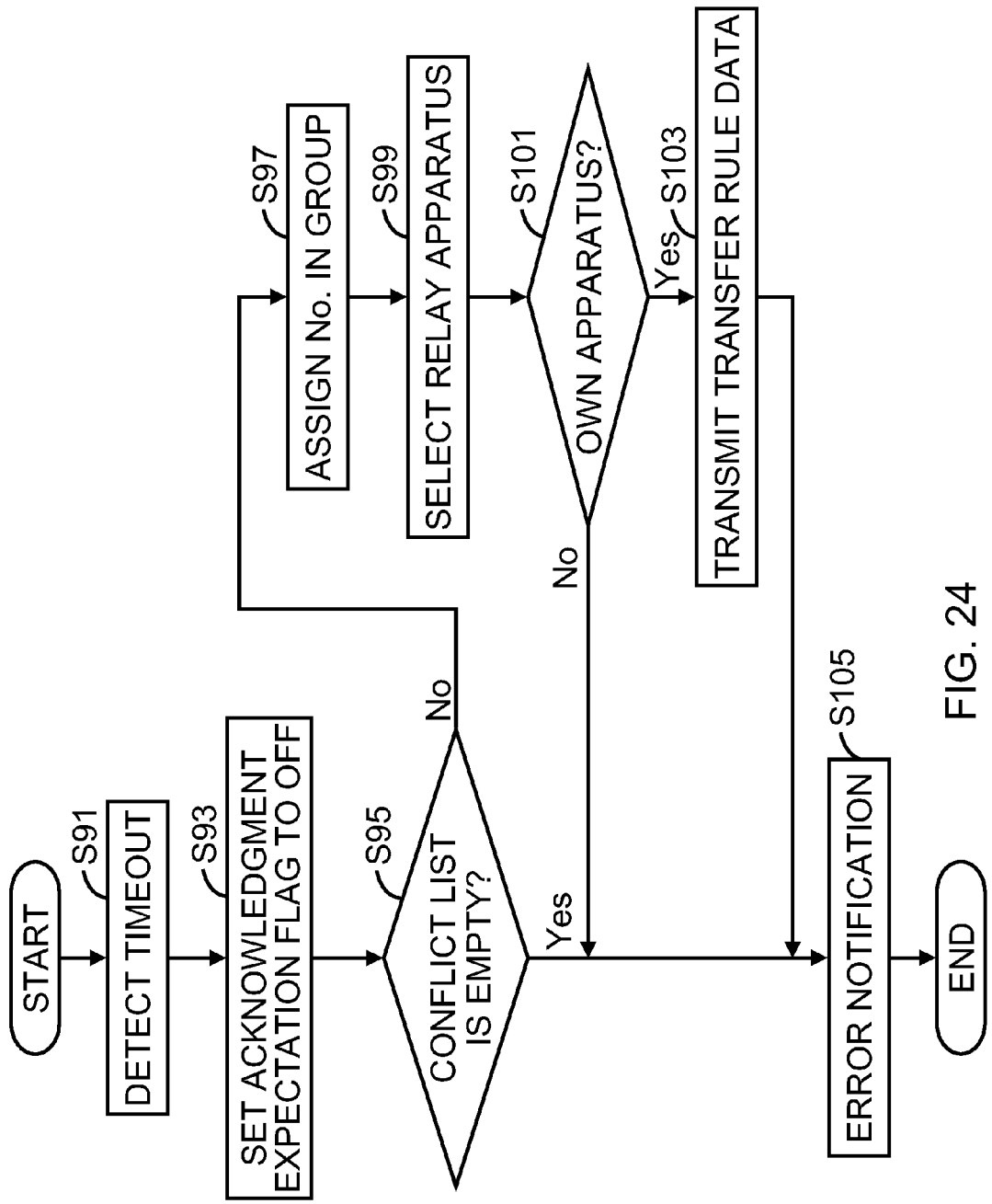
FIG. 24 is a diagram illustrating an example of an operation flow upon detecting timeout according to an embodiment of the present invention.

FIG. 24 illustrates an example of an operation flow upon detecting timeout according to the present embodiment. Operations upon detecting timeout of the acknowledgment expectation timer that has been started in operation S35 of FIG. 14 will be discussed with reference to FIG. 24.

In operation S91, the transfer rule processing section 511 detects timeout of the acknowledgment expectation timer. The timeout may be detected, for example, when no acknowledgment data has been received due to some kind of trouble on the relay apparatus 5 that may transmit the acknowledgment data for transfer rule notification data.

In operation S93, the transfer rule processing section 511 sets the acknowledgment expectation flag included in the status management table stored in the status management data storage 513 to indicate the OFF state.

In operation S95, the transfer rule processing section 511 determines whether the conflict list is empty, that is, no apparatus number has been registered in the conflict list stored in the status management data storage 513. When the conflict list is empty ("Yes" in operation S95), it is determined that no conflict among the transfer rules has occurred and the relay apparatus 5 skips operations S97 to S103. Then, the relay apparatus 5 advances the process to operation S105.

In operation S97, when the conflict list is not empty ("No" in operation S95), the transfer rule processing section 511 assigns a number in the conflict resolution group to each of the relay apparatuses 5 corresponding to the apparatus numbers registered in the conflict list. Since operation S97 is similar to operation S77, detailed discussion thereof will be omitted.

In operation S99, the transfer rule processing section 511 selects one of the relay apparatuses 5 listed up in the conflict list stored in the status management data storage 513 in accordance with a hash value (e.g., a remainder) of the identifier for which the conflict has occurred and the numbers in conflict resolution group. Since operation S99 is similar to operation S79, detailed discussion thereof will be omitted.

In operation S101, the transfer rule processing section 511 determines whether the relay apparatus 5 selected at operation S99 is its own apparatus.

In operation S103, when the relay apparatus 5 selected at operation S99 is its own apparatus ("Yes" in operation S101), it is determined that transfer rule notification data in which the conflict resolution flag is set to indicate the ON state should be transmitted to other relay apparatuses 5. Then, the transfer rule processing section 511 instructs the transfer rule transmitting section 515 to transmit the transfer rule notification data to other relay apparatuses 5 by broadcasting. The transfer rule transmitting section 515 transmits the transfer rule notification data to other relay apparatuses 5 by broadcasting in response to the instruction from the transfer rule processing section 511. Since operation S101 is similar to operation S83, detailed discussion thereof will be omitted. Thereafter, the relay apparatus advances the process to operation S105.

When the relay apparatus 5 selected at operation S99 is not its own apparatus ("No" in operation S101), the relay apparatus 5 skips operation S103. Then, the relay apparatus 5 advances the process to operation S105.

In operation S105, the transfer rule processing section 511 performs predetermined operations for error handling. For example, the relay apparatus 5 may notify the administrator terminal (not illustrated) of the error occurrence. Thereafter, the relay apparatus 5 terminates the process.

Thus, the conflict among the transfer rules may be resolved even when the acknowledgment data has not been transmitted.

Embodiments of the present invention are not limited to the above-discussed embodiment. For example, the functional block diagram of the above-discussed relay apparatus 5 does not necessarily correspond to an actual configuration of program modules.

The data configuration of each of the above-discussed tables has been exemplarily discussed so that an actual table does not necessarily have the above-discussed configurations. The order of operations illustrated in the operation flows may be changed or the operations may be performed in parallel so long as the operations in the changed order or operations performed in parallel provide the same result.

Figure 28:
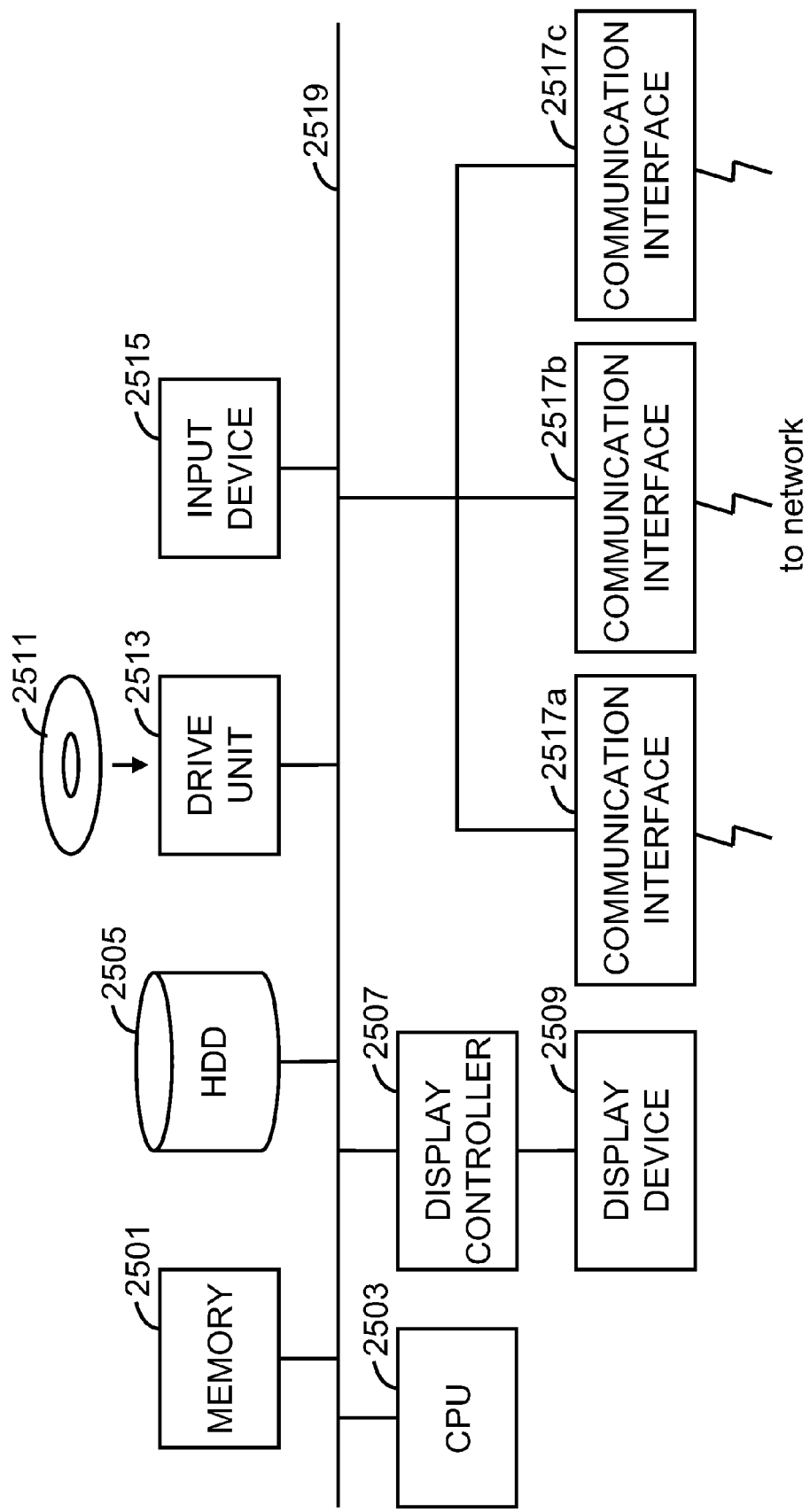
FIG. 28 is a diagram illustrating an example of a system configuration of a computer.

The above-discussed relay apparatus 5 may be a computer apparatus. FIG. 28 illustrates an example of a system configuration of a computer. The computer illustrated in FIG. 28 includes a memory 2501, a central processing unit (CPU) 2503, a hard disk drive (HDD) 2505, a display controller 2507 connected to a display device 2509, a drive unit 2513 provided for a removable disk 2511, an input device 2515, and communication interfaces 2517*a*, 2517*b*, and 2517*c* provided for connection to a network. These components are connected to one another via a bus 2519. In some cases, the display controller 2507, the display device 2509, the drive unit 2513, and the input device 2515 may not be included in the relay apparatus 5. An operating system (OS) and application programs provided to perform the operations discussed in the embodiments are stored in the HDD 2505, and are loaded into the memory 2501 to be executed by the CPU 2503. The CPU 2503 controls and manages the display controller 2507, the communication interface 2517, and the drive unit 2513 to perform appropriate operations. Data received via any one of the communication interfaces 2517 is transmitted via another one of the communication interfaces 2517. The CPU 2503 controls the communication interface 2517 to appropriately change the output destination to another. Data under processing is stored in the memory 2501, and may be stored in the HDD 2505, as appropriate. According to an embodiment of the present invention, application programs provided to execute the above-discussed operations may be stored in a non-transitory computer-readable removable disk 2511 for distribution, and is installed from the drive unit 2513 to the HDD 2505. The non-transitory computer-readable removable disk 2511 includes a flexible disk, a compact disc read only memory (CD-ROM), a magneto-optical disk, and a hard disk. Alternatively, the application programs maybe stored in a semiconductor memory. The application programs are often installed into the HDD 2505 via a network such as the Internet and the communication interface 2517. The computer achieves the above-discussed various functions under the organic cooperation of hardware including the above-discussed CPU 2503, memory 2501, etc., the OS, and the appropriate application programs.

For example, functions including the above-discussed message receiving section 501, message analyzing section 503, transfer destination determining section 505, message transmitting section 509, transfer rule processing section 511, and transfer rule transmitting section 515 may be achieved under the organic cooperation of hardware including the above-discussed CPU 2503, memory 2501, etc., the OS, and the appropriate application programs. Data of the transfer rule illustrated in FIG. 7, the status management table illustrated in FIG. 8, the acknowledgment necessity table illustrated in FIG. 9, the conflict list illustrated in FIG. 11, and the identification rule illustrated in FIG. 15 may be stored in the memory 2501 or the HDD 2505.

Some or all of the operations discussed above may be implemented as a computer executable code. Such a computer executable code contains a plurality of computer instructions that when performed result in the execution of the tasks discussed herein. Such computer executable code may be available as source code or in object code, and may be further included as part of, for example, a portable memory device or downloaded from the Internet, or embodied on a program storage unit or computer readable medium. Computer executable code may also be available on a computer-readable storage medium which includes all computer-readable media except for a transitory, propagating signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A relay apparatus for transferring message data received from a client to one of a plurality of servers, the relay apparatus comprising:
   a status management data storage configured to hold data of an acknowledgment necessity table, the acknowledgment necessity table including first identification information of a first apparatus to which the relay apparatus acknowledges when the relay apparatus has received first transfer rule notification data from the first apparatus, the first apparatus being one of a plurality of relay apparatuses each of which broadcasts transfer rule notification data; and
   a processor, the processor comprising:
      a transfer rule handling section configured to determine whether the acknowledgment necessity table includes the first identification information identical to second identification information of a second apparatus upon receiving second transfer rule notification data from the second apparatus, the second apparatus being one of the plurality of relay apparatuses;
      an acknowledgment transmitting section configured to transmit acknowledgment data to the second apparatus when the acknowledgment necessity table includes the first identification information identical to the second identification information,
         wherein the transfer rule notification data includes transfer destination information, the transfer destination information including identifier data and address data, the address data being of a server to which the message data including the identifier data is transferred;
      a transfer rule storage configured to hold the transfer destination information;
      a rule checking section configured to extract, upon receiving the message data from the client, first identifier data from the received message data to determine whether the transfer rule storage holds first transfer destination information including the first identifier data;
      a transfer rule generating section configured to determine, when the transfer rule storage does not hold the first transfer destination information, a first server to which message data including the first identifier data is transmitted, and store second transfer destination information including the first identifier data and first address data of the first server; and
      a broadcasting section configured to broadcast the transfer rule notification data including the second transfer destination information to the plurality of relay apparatuses.

2. The relay apparatus according to claim 1, further comprising:
   an acknowledgment handling section configured to start predefined operations upon receiving, from any one of the plurality of relay apparatuses, acknowledgment data for transfer rule notification data broadcasted to the plurality of relay apparatuses.

3. The relay apparatus according to claim 1, wherein the transfer rule handling section further
   determines, upon receiving third transfer rule notification data, whether the transfer rule storage holds the transfer destination information identical to third transfer destination information included in the third transfer rule notification data, and
   stores the third transfer destination information in the transfer rule storage when the transfer rule storage does not hold the transfer destination information identical to the third transfer destination information.

4. The relay apparatus according to claim 1, wherein each acknowledgment necessity table of the plurality of relay apparatuses includes identification information different from each other.

5. A non-transitory computer-readable recording medium storing a program that causes a computer to execute a procedure, the computer being a relay apparatus for transferring message data received from a client to one of a plurality of servers, the procedure comprising:
   determining whether an acknowledgment necessity table includes identification information identical to first identification information of a first apparatus upon receiving first transfer rule notification data from the first apparatus, the acknowledgment necessity table including second identification information of a second apparatus to which the computer acknowledges when the computer has received second transfer rule notification data from the second apparatus, the first apparatus being one of a plurality of relay apparatuses each of which broadcasts transfer rule notification data, the second apparatus being one of the plurality of relay apparatuses; and
   transmitting acknowledgment data to the first apparatus when the acknowledgment necessity table includes the identification information identical to the first identification information,
      wherein the transfer rule notification data includes transfer destination information, the transfer destination information including identifier data and address data, the address data being of a server to which the message data including the identifier data is transferred;
   holding the transfer destination information;
   extracting, upon receiving the message data from the client, first identifier data from the received message data to determine whether the transfer rule storage holds first transfer destination information including the first identifier data;
   determining, when the transfer rule storage does not hold the first transfer destination information, a first server to which message data including the first identifier data is transmitted, and storing second transfer destination information including the first identifier data and first address data of the first server; and
   broadcasting the transfer rule notification data including the second transfer destination information to the plurality of relay apparatuses.

6. A method executed by a relay apparatus for transferring message data received from a client to one of a plurality of servers, the method comprising:
   determining, by the relay apparatus, whether an acknowledgment necessity table includes identification information identical to first identification information of a first apparatus upon receiving first transfer rule notification data from the first apparatus, the acknowledgment necessity table including second identification information of a second apparatus to which the relay apparatus acknowledges when the relay apparatus has received second transfer rule notification data from the second apparatus, the first apparatus being one of a plurality of relay apparatuses each of which broadcasts transfer rule notification data, the second apparatus being one of the plurality of relay apparatuses; and transmitting acknowledgment data to the first apparatus when the acknowledgment necessity table includes the identification information identical to the first identification information, wherein the transfer rule notification data includes transfer destination information, the transfer destination information including identifier data and address data, the address data being of a server to which the message data including the identifier data is transferred;

holding the transfer destination information;

extracting, upon receiving the message data from the client, first identifier data from the received message data to determine whether the transfer rule storage holds first transfer destination information including the first identifier data;

determining, when the transfer rule storage does not hold the first transfer destination information, a first server to which message data including the first identifier data is transmitted, and storing second transfer destination information including the first identifier data and first address data of the first server; and broadcasting the transfer rule notification data including the second transfer destination information to the plurality of relay apparatuses.

7. A relay apparatus for transferring message data received from a client to one of a plurality of servers, the relay apparatus comprising:

a storage for holding data of an acknowledgment necessity table, the acknowledgment necessity table including first identification information of a first apparatus to which the relay apparatus acknowledges when the relay apparatus has received first transfer rule notification data from the first apparatus, the first apparatus being one of a plurality of relay apparatuses each of which broadcasts transfer rule notification data;

a processor for determining whether the acknowledgment necessity table includes the first identification information identical to second identification information of a second apparatus upon receiving second transfer rule notification data from the second apparatus, the second apparatus being one of the plurality of relay apparatuses, and transmitting acknowledgment data to the second apparatus when the acknowledgment necessity table includes the first identification information identical to the second identification information, wherein the transfer rule notification data includes transfer destination information, the transfer destination information including identifier data and address data, the address data being of a server to which the message data including the identifier data is transferred;

a transfer rule storage for holding the transfer destination information;

a rule checking section for extracting, upon receiving the message data from the client, first identifier data from the received message data to determine whether the transfer rule storage holds first transfer destination information including the first identifier data;

a transfer rule generating section for determining, when the transfer rule storage does not hold the first transfer destination information, a first server to which message data including the first identifier data is transmitted, and store second transfer destination information including the first identifier data and first address data of the first server; and a broadcasting section for broadcasting the transfer rule notification data including the second transfer destination information to the plurality of relay apparatuses.

* * * * *